United States Patent [19]
Maekawa et al.

[11] Patent Number: 5,940,653
[45] Date of Patent: Aug. 17, 1999

[54] CONTROL OVER IMAGE FORMATION BASED ON CHANGE IN STATUS OF IMAGE FORMATION MEANS

[75] Inventors: Shinichiro Maekawa, Kawasaki; Koichiro Akimoto, Fujisawa; Nobuyoshi Kakigi, Sakura, all of Japan

[73] Assignee: Canon Kabushiki Kaisha, Tokyo, Japan

[21] Appl. No.: 08/840,812

[22] Filed: Apr. 16, 1997

[30] Foreign Application Priority Data

Apr. 19, 1996 [JP] Japan .................................. 8-120839

[51] Int. Cl.$^6$ .................................................. G03G 15/00
[52] U.S. Cl. ................................................................ 399/9
[58] Field of Search ................................ 399/1, 2, 8, 9, 399/16, 23, 38, 45, 46, 75, 88, 130

[56] References Cited

U.S. PATENT DOCUMENTS

| | | | |
|---|---|---|---|
| 4,930,087 | 5/1990 | Egawa et al. | 395/113 |
| 4,999,654 | 3/1991 | Maruo et al. | 347/225 |
| 5,305,055 | 4/1994 | Ebner et al. | 399/9 |
| 5,383,012 | 1/1995 | Yamada | 399/8 X |
| 5,414,494 | 5/1995 | Aikens et al. | 399/1 |
| 5,420,667 | 5/1995 | Kaneko et al. | 399/8 |
| 5,568,618 | 10/1996 | Motoyama | 399/8 X |
| 5,600,403 | 2/1997 | Inoo | 399/8 |

FOREIGN PATENT DOCUMENTS

| | | |
|---|---|---|
| 0 654 757 A2 | 5/1995 | European Pat. Off. . |
| 0 661 600 A2 | 7/1995 | European Pat. Off. . |

*Primary Examiner*—Sandra Brase
*Attorney, Agent, or Firm*—Fitzpatrick, Cella, Harper & Scinto

[57] ABSTRACT

An image forming system provided with a printer engine and a controller which communicates with the printer engine over a serial communication interface. The controller receives a condition change signal from the printer engine over a dedicated signal line, which is outputted by the printer when the condition of the printer engine changes. The identity of the condition that has changed is then communicated over the serial communication interface. Further, the controller designates one of a plurality of kinds of condition changes, in response to which the condition change signal is outputted, according to the conditions of the controller or the image forming system.

46 Claims, 16 Drawing Sheets

FIG. 13

| SYSTEM STATE / CCRT STATUS | DURING INITIALIZATION | DURING IDLING | DURING PRINTING | DURING POWER-THRIFTY STANDBY |
|---|---|---|---|---|
|  | NONE | TONER REDUCTION PRESENCE OF PAPER PAPER SIZE | PRESENCE OF PAPER | NONE |

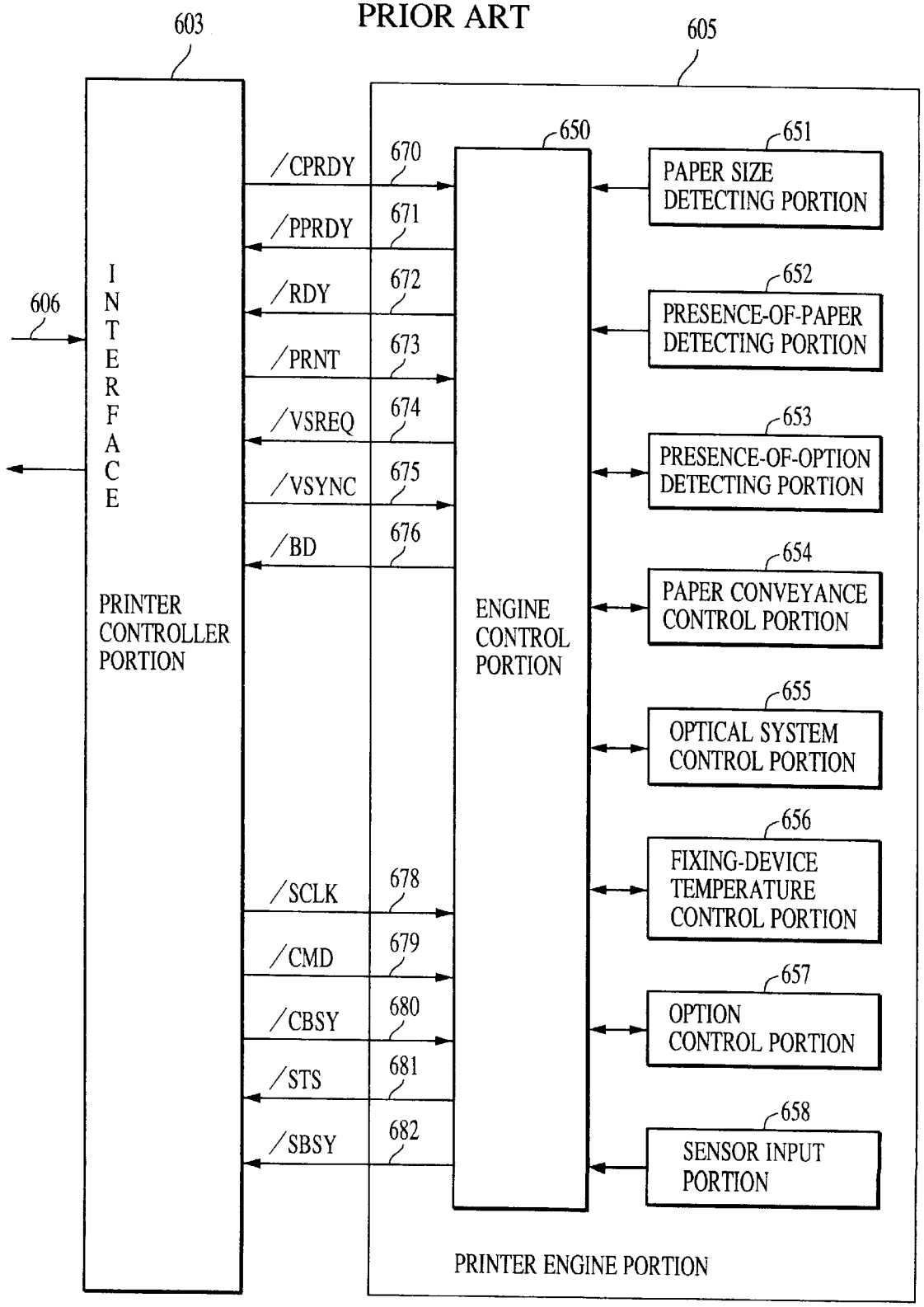

CONTROL OVER IMAGE FORMATION BASED ON CHANGE IN STATUS OF IMAGE FORMATION MEANS

BACKGROUND OF THE INVENTION

1. Field of the Invention

The present invention relates to control over the image formation part of an image forming apparatus, particularly control based on a change in status or condition of the image formation part.

2. Description of the Related Art

A variety of output apparatuses have conventionally been used for output by a computer, including image forming apparatuses, such as an electrophotographic printer (hereunder referred to as a "laser beam printer"), bubble jet printers, and the like.

FIG. 16 is a block diagram illustrating the configuration of a printer controller portion of a conventional image forming apparatus, the configuration of a printer engine portion thereof and an interface between both of these portions. In this case, the illustrated apparatus is as a laser beam printer including a printer controller portion 603 and a printer engine portion 605.

The printer engine portion 605 comprises an engine control portion 650, a paper (or sheet) size detecting portion 651, a presence-of-paper detecting portion 652, a presence-of-option detecting portion 653, a paper conveyance control portion 654, an optical system control portion 655, a fixing-device temperature control portion 656, an option control portion 657 and a sensor input portion 658.

The printer controller 603 is operative to communicate with external equipment (to be described later) over interface 606 (such as an interface to a centronics or IEEE-1284 communication port), to receive image data therefrom and further develop the received image data to printable information. Moreover, the printer controller portion 603 is operative to exchange various kinds of signals with the engine control portion 650 and performs a serial communication therewith. The engine control portion 650 controls each of the units or parts of the printer engine portion 605 through the exchange of the signals and the serial communication.

The paper size detecting portion 651 is operative to detect the paper size of paper stored in a paper (or sheet) cassette (to be described later) and to further transmit detection information to the engine control portion 650. The presence-of-paper detecting portion 652 is operative to detect whether or not sheets of paper are stored in the paper cassette, and to further transmit detection information to the engine control portion 650. The presence-of-paper detecting portion 652 is also operative to detect the presence of paper at each of a manual paper feed opening or entrance (not shown), an option-cassette paper feed opening (not shown) or an envelope-feeder opening (not shown).

The paper conveyance control portion 654 is operative to perform a control operation concerning the conveyance of paper. The optical system control portion 655 is operative to perform control operations concerning a scanner motor (not shown) and an optical system using laser light. The fixing-device temperature control portion 656 is operative to control the temperature of a fixing device (not shown) and detect an abnormality therein. The option control portion 657 is operative to send action directives to the option cassette (not shown) and the envelope feeder (not shown). The sensor input portion 658 is operative to detect the presence of paper in a conveyance path at the time of performing an operation of a resist shutter, a paper discharging operation, a both-side (or duplex) print operation and a paper reversing operation.

The interface (hereunder referred to as a "video interface") between the engine control portion 650 and the printer controller portion 603 will be described hereinbelow corresponding to each of the following signals exchanged therebetween.

First, /CPRDY signal 670 indicates that the printer controller portion 603 is in a state in which this portion 603 can communicate with the engine control portion 650, and is transmitted from the printer controller portion 603 to the engine control portion 650. Next, /PPRDY signal 671 indicates that the printer controller portion 603 is in a standby state in which the engine control portion 650 is ready for communicating with the printer controller portion 603, and is transmitted from the engine control portion 650 to the printer controller portion 603.

Further, /RDY signal 672 indicates a standby state of the engine control portion 650, and is transmitted from the engine control portion 650 to the printer controller portion 603. If the engine control portion 650 is ready for printing, this signal represents a value of "TRUE". In the case that the engine control portion 650 is not ready for printing, the /RDY signal 672 has a value of "FALSE". Further, /PRNT signal 673 indicates a request for printing issued from the printer controller portion 603 to the engine control portion 650, and is transmitted from the printer controller portion 603 to the engine control portion 650.

Furthermore, /VSREQ signal 674 indicates a request for a vertical synchronization (or synchronizing) signal issued from the engine control portion 650 to the printer controller portion 603, and is transmitted from the engine control portion 650 to the printer controller portion 603. Additionally, /VSYNC signal 675 is a vertical synchronization signal outputted by the printer controller portion 603 to the engine control portion 650 and is transmitted from the printer controller portion 603 to the engine control portion 650. /BD signal 676 is a horizontal synchronization signal and is transmitted from the engine control portion 650 to the printer controller portion 603.

Further, /SCLK signal 678 is a synchronous clock signal for serial communication and is transmitted from the printer controller portion 603 to the engine control portion 650. Moreover, /CMD signal 679 is a command sent from the printer controller portion 603 to the engine control portion 650, and is transmitted from the printer controller portion 603 to the engine control portion 650. Furthermore, /CBSY signal 680 is a strobe signal for outputting a command and is transmitted from the printer controller portion 603 to the engine control portion 650.

In addition, /STS signal 681 is the status of the inside of the printer engine portion 605 and is transmitted from the engine control portion 650 to the printer controller portion 603 as an output thereof in response to a command from the printer controller portion 603. Further, /SBSY signal 682 indicates status output period and is transmitted from the engine control portion 650 to the printer controller portion 603.

In the case of such a conventional image forming apparatus, the printer controller portion receives information such as a paper conveyance condition, errors due to a paper jam or the like, and warnings of a reduction in the remaining quantity of toner, from the engine control portion by performing a serial communication prescribed by the aforementioned video interface (more particularly, a communication to be performed by using the /SCLK signal 678, the /CMD signal 679, the /CBSY signal 680, the /STS signal 681 and the /SBSY signal 682 of FIG. 16), and performs a predetermined operation corresponding to the received information.

Further, the aforementioned video interface has a signal line (corresponding to the /RDY signal 672) dedicated to indicate a printable state or an unprintable state. The printer controller portion does not perform an operation of recognizing the state (for example, a jam state) of the printer engine portion until this /RDY signal has a value of "FALSE" representing the unprintable state. In contrast, in the normal case, namely, in the case that the /RDY signal 672 has a value of "TRUE" representing the printable state, the printer controller portion is adapted to keep track only of the warning of a reduction in the remaining quantity of toner, which does not relate to whether or not a printing operation can be performed, by monitoring polling signals.

Recently, in connection with an image forming apparatus that has a plurality of paper feed portions, such as a plurality of paper (or sheet) cassettes or a plurality of multiple purpose (or use) trays, it has been considered to provide the apparatus what is called an automatic paper feed selection function, namely, a function to recognize the (size of) paper included in the plurality of paper feed portions, searching the plurality of paper feed portions for paper of an indicated size, and selecting a paper feed portion, in which sheets of paper of the size matched with the designated size are included, from the plurality of paper feed portions as a paper feed portion to be actually used for feeding paper.

Moreover, there has been already known another image forming apparatus that has a power-thrifty standby mode in which unnecessary consumption of power is suppressed in an idle state.

However, in the case of the aforementioned image forming apparatuses, it is necessary to monitor or otherwise keep track of states (for example, a paper jam state and a state in which a door is opened), which are not reflected by the /RDY signal 672 in the printer engine portion, namely, the image forming portion. This involves periodic serial communications regardless of changes in such states, and consequently without regard to the need for such serial communication. Especially, in the case of employing the automatic paper feed selection functions, a serial communication for selecting one of the paper feed portions is needed every printing operation. Thus, conventional image forming apparatuses have problems in that there is processing overhead to perform monitoring operations, and this processing overhead becomes a factor which impedes high-speed communications and puts an excessive burden on the control portion. To reduce this overhead, it has been considered to provide the apparatus with a signal line dedicated to each different status of the image forming portion, but this idea is not practical as to the cost thereof.

Therefore, the aforementioned conventional image forming apparatuses have an additional problem in that it is difficult to prevent reduced speed of communications caused by the increase in burden put on the control portion from its monitoring operations, while at the same time reducing the cost thereof.

SUMMARY OF THE INVENTION

An object of the invention is to address the foregoing situation, by providing control over an image formation portion based on a change in status or condition thereof. In one aspect, the present invention provides an image processing (or forming) apparatus which does not need to perform serial communication in order to recognize the condition (of the image forming portion (or the printer engine)), unless a change signal is generated. Thus, processing overhead is reduced to thereby speed up communications and decrease the burden put on the control portion at a low cost.

In another aspect, the present invention provides an image forming method, which performs serial communications or the like to obtain this condition of the image forming portion only in response to generation of a change signal by the image forming portion. Thus, processing overhead is reduced, thereby speeding up the communications and decreasing the burden put on the control portion at a low cost.

In another aspect, the present invention provides an image forming system that has an image processing apparatus which does not need to perform serial communication in order to recognize the condition (of the image forming portion) unless a change signal is generated. Thus, processing overhead is reduced to thereby speed up the communications and decrease the burden put on the control portion at a low cost.

In accordance with the present invention, a change signal is generated indicating that a change occurs in predetermined conditions of an image forming portion. The generated change signal may be accepted, or it may be rejected (or ignored). In the case that the generated change signal is accepted, the predetermined condition is recognized, preferably by follow-up serial communication. Thus, unless the change signal is generated, it is unnecessary to recognize the predetermined condition (of the image forming portion) by performing a serial communication or the like. Thus, processing overhead is reduced and the speed at which the communication is performed is increased and the burden imposed on the control portion is decreased at a low cost.

In accordance with preferred embodiments the predetermined conditions for which the change signal is generated are designated. Thus, the necessity for recognizing the condition by performing a needless serial communication or the like is obviated by specifying only a necessary factor. Consequently, maximum information efficiency is obtained by using a minimum number of signal lines. Preferably, the predetermined.

Conditions for which the change signal is generated are designated by the operating portion of the aforesaid image processing (or forming) apparatus or an external device connected to the aforesaid image processing apparatus, or both. Thus, the flexibility of the apparatus is enhanced.

In accordance with other preferred embodiments of the present invention, the conditions for which the change signal is generated are designated according to an operating situation of the image forming portion. Recognition of the condition by a needless serial communication or the like is thus avoided even more adaptively.

Preferably, the recognized and predetermined conditions are informed or notified. The predetermined conditions may be recognized in real time.

In accordance with other preferred embodiments of the present invention, the recognized and predetermined conditions are informed by a visual display or a transmission to the external device, or both. The predetermined condition is recognized by the external device in real time.

In accordance with further preferred embodiments of the present invention, in the case that the paper conveyance condition in the aforesaid image processing (or forming)

apparatus is recognized as being bad, a (current) paper conveyance path is changed to another paper conveyance path. Thus, a printing operation is continued by using the latter paper conveyance path as an alternative path. Consequently, the automatic paper feed selection function is smoothly performed.

Preferably, the generated change signal may be reset. Thus, the operability is enhanced.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 13 is a table listing statuses to be assigned to a /CCRT signal in step S1202 of the process of FIG. 12;

FIG. 16 is a block diagram illustrating the configurations of the printer controller portion, the printer engine portion and the interface between these portions of the conventional image forming apparatus.

DETAILED DESCRIPTION OF THE PREFERRED EMBODIMENTS

Hereinafter, the preferred embodiments of the present invention will be described in detail by referring to the accompanying drawings.

First Embodiment

Figure 1:
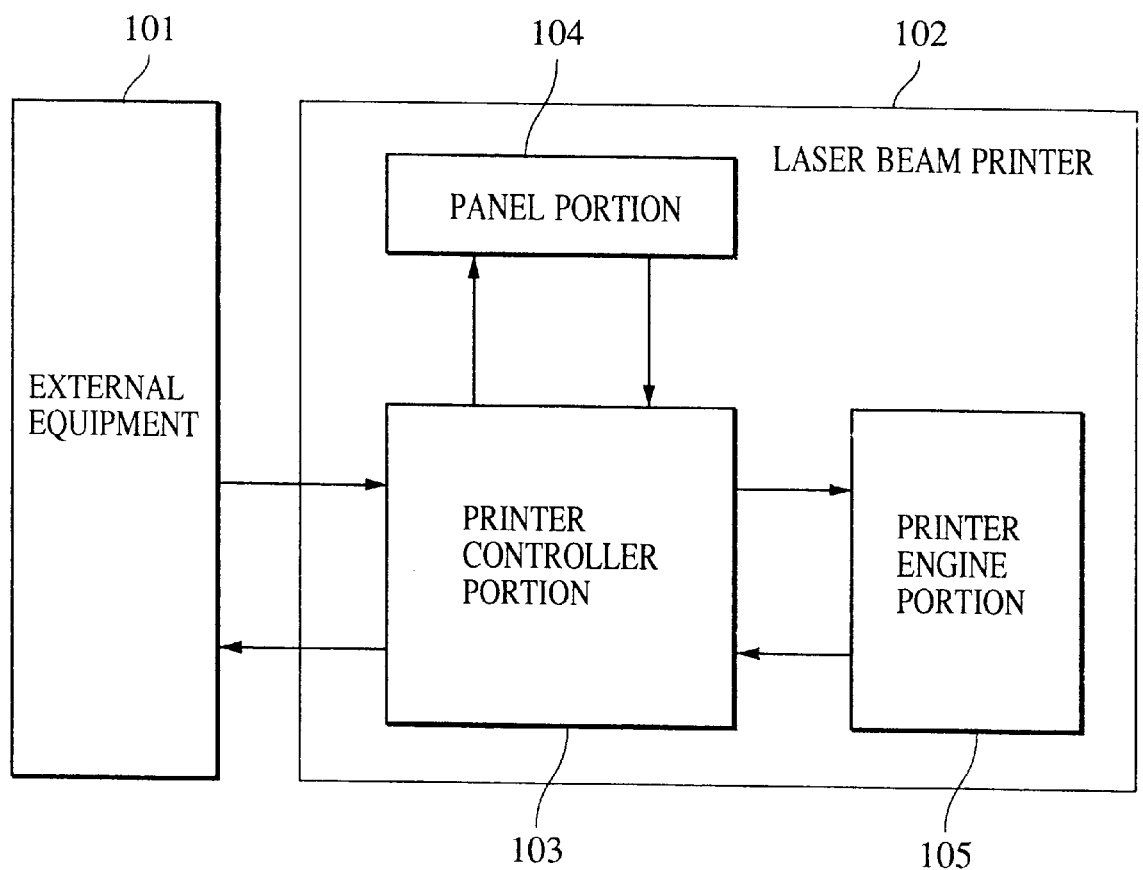
FIG. 1 is a block diagram illustrating the entire configuration of an image forming apparatus which is a first embodiment of the present invention.

FIG. 1 is a block diagram illustrating the entire configuration of an image forming apparatus which is a first embodiment of the present invention. This image forming apparatus is configured as what is called a laser beam printer 102.

The laser beam printer 102 is connected to external equipment 101 such as a host computer. Further, the laser beam printer 102 comprises a printer controller portion 103, a panel portion 104 and a printer engine portion 105. The printer controller portion 103 is connected to the external equipment 101, the panel portion 104 and the printer engine portion 105. The printer engine portion 105 performs a printing operation through a well-known electrophotographic process in which a latent image is formed on a photosensitive drum (to be described later) based on image data (namely, binary data or multi-value data), the latent image is developed and transferred onto paper, and the transferred image is fixed thereon. The printer controller portion 103 receives code data (namely, ESC (escape)) code and various kinds of PDL (Page Description Language)) transmitted from the external equipment 101 and generates page information, which consists of dot data, according to the code data and further transmits image data, which corresponds to the aforementioned page information, to the printer engine portion 105 by using a predetermined interface means. The panel portion 104 is an interface with a user (namely, an operator). Thus, by operating the panel portion 104, the user can instruct the laser beam printer 102 to perform various operations.

Figure 2:
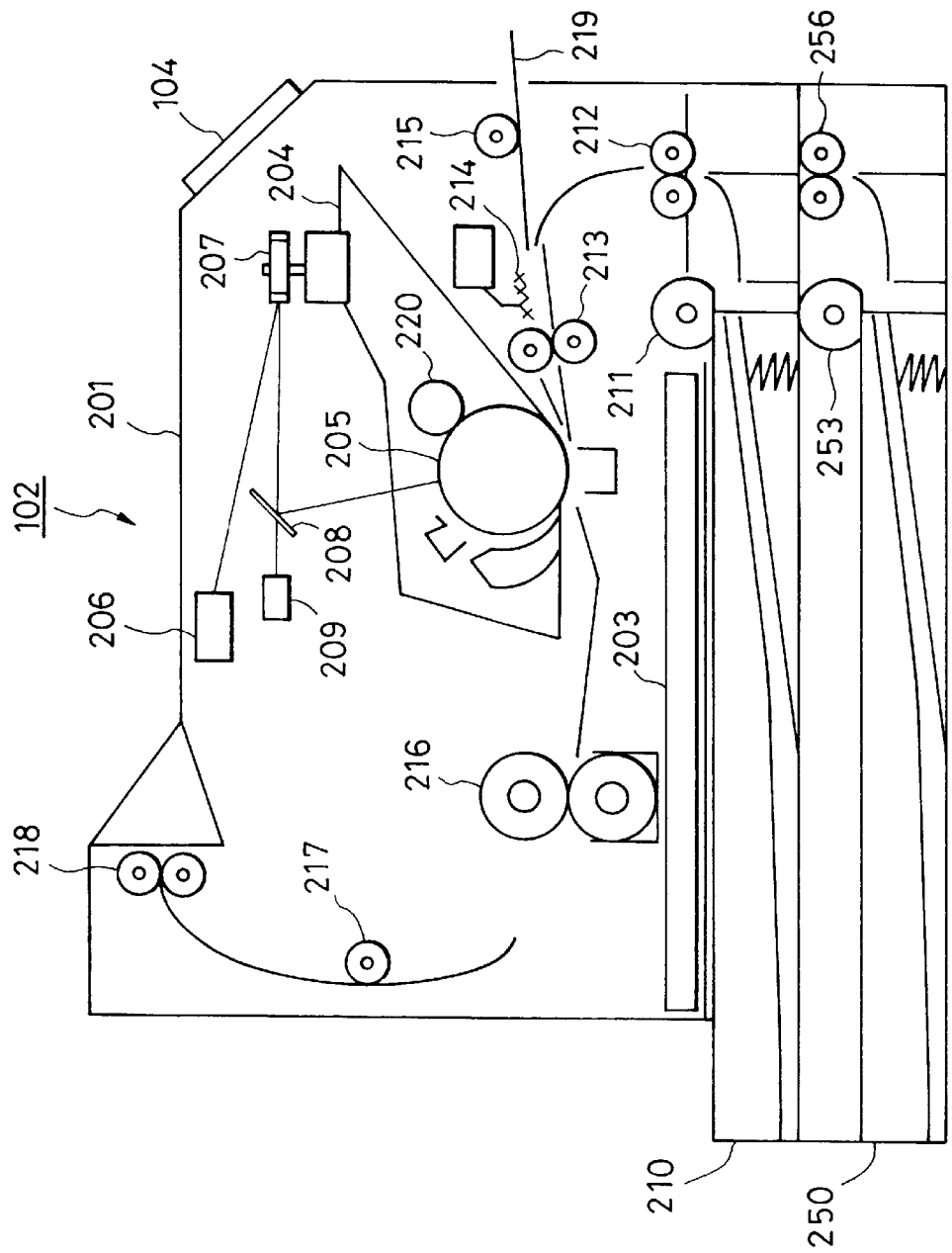
FIG. 2 is a sectional view of the image forming apparatus of FIG. 1.

FIG. 2 is a sectional view of the image forming apparatus of FIG. 1. In this figure, the same reference numerals designate the same composing elements as those in FIG. 1.

In this figure, reference numeral 201 designates a printer housing (or enclosure). The panel portion 104 is provided with a switch for performing an operation, an LED (Light Emitted Diode) display device and/or an LCD (Liquid Crystal Display) device. A control board housing (or storage) portion 203 includes the printer controller portion 103 and the printer engine portion 105.

A paper (or sheet) cassette 210 contains sheets of paper and has a mechanism for electrically detecting paper size by means of a partition (or divider) plate (not shown). A cassette paper feed clutch 211 separates only the uppermost (or top) sheet of paper from a plurality of sheets of paper contained in the paper cassette 210 and conveys the separated sheet of paper to paper feed rollers 212 by means of a drive means (not shown) utilizing a cam function. This cassette paper feed clutch 211 intermittently rotates for every feed of paper. Namely, one sheet of paper is supplied correspondingly to one revolution of the cassette paper feed clutch 211.

A resist shutter 214 is operative to stop a paper feed operation by pressing a sheet of paper. The paper feed rollers 212 convey the leading edge portion of a paper sheet to the resist shutter 214.

A paper cassette 250 also has a mechanism for electrically detecting paper size by means of a partition plate (not shown). A cassette paper feed clutch 253 separates only the uppermost (or top) sheet of paper from a plurality of sheets of paper stored in the paper cassette 250 and conveys the separated sheet of paper to paper feed rollers 256 by means of a drive means (not shown) utilizing a cam function. This cassette paper feed clutch 253 intermittently rotates for every feed of paper. Namely, one sheet of paper is supplied correspondingly to one rotation of the cassette paper feed clutch 253. The paper feed rollers 256 convey the paper to the paper feed rollers 212.

Meanwhile, a sheet of paper manually put on a manual paper feed tray 219 is conveyed by a paper feed clutch 215 in such a manner that the leading edge portion of this paper reaches the resist shutter 214. Further, one of the paper cassettes 210 and 250 and the paper feed tray 219 is selected as a paper feed portion to be actually used for a paper feed operation.

The printer engine portion 105 communicates with the printer controller portion 103 by using a predetermined communication protocol. The printer controller portion 103 instructs the printer engine portion 105 to select one of the paper cassettes 210 and 250 and the manual paper feed tray 219 as a paper feed portion to be actually used for a paper feed operation. Then, in response to a print starting instruction, the printer engine portion 105 causes the selected paper feed portion to start performing a print feed operation as above described. Thus, a sheet of paper is conveyed to the resist shutter 214.

A cartridge 204 has a photosensitive drum 205 and a toner holding portion (not shown). When a sheet of paper is conveyed to the resist shutter 214, a semiconductor laser (not shown) is driven by a laser driver 206 in such a manner as to turn on or off according to image data transmitted from the printer controller portion 103. Laser beams emitted from this semiconductor laser are caused by a rotating polygon mirror 207 to scan in a main (or primary or horizontal) scanning direction. Further, the laser beams are led onto the photosensitive drum 205 through a reflection mirror 208. Thus, a latent image is formed on a main scanning line of photosensitive drum 205.

The resist shutter 214 is upwardly driven in synchronization with the emission of this laser beam. The conveyance of a sheet of paper is synchronized with the auxiliary (or secondary or vertical) scan by the laser beam. A beam detector 209, which is positioned in correspondence to the start of a scan line by the laser beam, produces a synchronization signal, which is used for determining the image writing timing in the case of the main scanning, by detecting the laser beam. Subsequently, the beam detector sends this synchronization signal to the printer controller portion 103.

Thereafter, the sheet of paper is conveyed by conveyance rollers 213. Further, the photosensitive drum 205 is driven and rotated by a motor (not shown). Moreover, the formed (latent) image is developed with toner by a developing device 220 to form a toner image. Subsequently, the toner image is transferred onto the paper. The toner image transferred onto the paper is further heat-fixed thereonto by means of fixing rollers 216. The paper, on which the toner image is heat-fixed, is discharged or ejected by discharge rollers 218 to a discharge tray (not shown) of the printer housing 201 through conveyance rollers 217 and 218.

Figure 3:
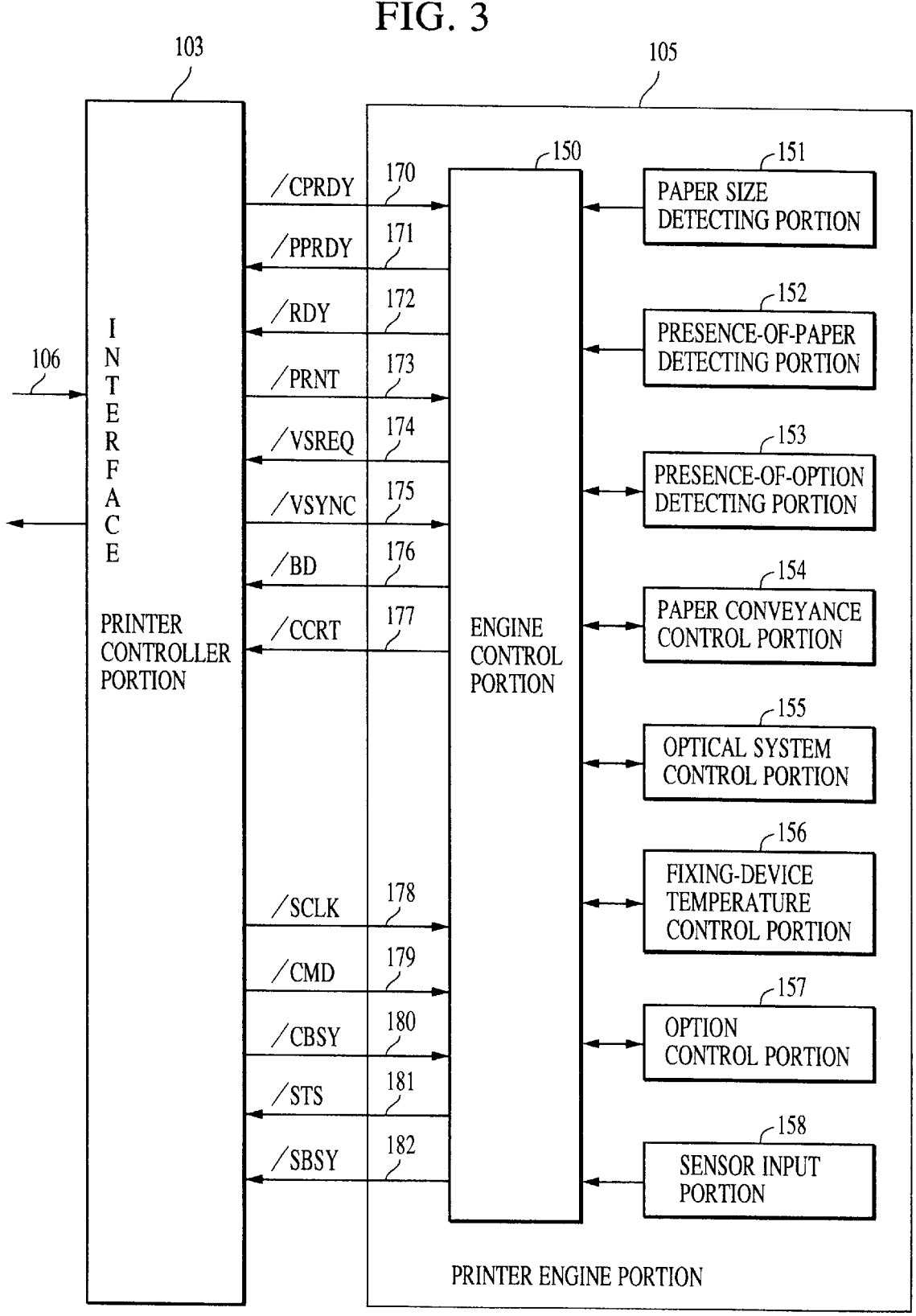
FIG. 3 is a block diagram illustrating the configurations of a printer controller portion, a printer engine portion and an interface between these portions of the image forming apparatus.

FIG. 3 is a block diagram illustrating the configurations of the printer controller portion 103, the printer engine portion 105, and a signal interface (hereunder referred to as a video interface) between these portions of the image forming apparatus that is the first embodiment of the present invention. The arrangement of signals in the signal interface differs from the aforementioned conventional image forming apparatus primarily in that a /CCRT signal 177, which is transmitted from the engine control portion 150 to the printer controller portion 103, is added. Therefore, in FIG. 3, like reference numerals designate the same composing elements as those in FIG. 16.

The printer engine portion 105 comprises an engine control portion 150, a paper (or sheet) size detecting portion 151, a presence-of-paper detecting portion 152, a presence-of-option detecting portion 153, a paper conveyance control portion 154, an optical system control portion 155, a fixing-device temperature control portion 156, an option control portion 157, and a sensor input portion 158.

The printer controller 103 is operative-to communicate with external equipment 101 (to be described later) via interface 106, to receive image data therefrom and further develop the received image data to printable information. Moreover, the printer controller portion 103 is operative to exchange various kinds of signals with the engine control portion 150 and to perform a serial communication therewith. The engine control portion 150 controls each of the units of the printer engine portion 105 through the exchange of the signals and the serial communication.

The paper size detecting portion 151 is operative to detect the paper size of paper stored in a paper (or sheet) cassette (to be described later) and to further transmit detection information to the engine control portion 150. The presence-of-paper detecting portion 152 is operative to detect whether or not sheets of paper are stored in the paper cassette, and to further transmit detection information to the engine control portion 150. The presence-of-paper detecting portion 152 is also operative to detect the presence of paper at each of a manual paper feed opening or entrance (not shown), an option-cassette paper feed opening (not shown) or an envelope-feeder opening (not shown).

The paper conveyance control portion 154 is operative to perform a control operation concerning the conveyance of paper. The optical system control portion 155 is operative to perform control operations concerning a scanner motor (not shown) and an optical system using laser light. The fixing-device temperature control portion 156 is operative to control the temperature of a fixing device (not shown) and detect an abnormality therein. The option control portion 157 is operative to send action directives to the option cassette (not shown) and the envelope feeder (not shown). The sensor input portion 158 is operative to detect the presence of paper in a conveyance path at the time of performing an operation of a resist shutter, a paper discharging operation, a both-side (or duplex) print operation and a paper reversing operation.

The signal interface (hereunder referred to as a "video interface") between the engine control portion 150 and the printer controller portion 103 will be described hereinbelow corresponding to each of the following signals exchanged therebetween.

A /CPRDY signal 170 indicates that the printer controller portion 103 is in a state in which this portion 103 can communicate with the engine control portion 150, and is transmitted from the printer controller portion 103 to the engine control portion 150. Next, /PPRDY signal 171 indicates that the printer controller portion 103 is in a standby state in which the engine control portion 150 is ready for communicating with the printer controller portion 103, and is transmitted from the engine control portion 150 to the printer controller portion 103.

Further, /RDY signal 172 indicates a standby state of the engine control portion 150, and is transmitted from the engine control portion 150 to the printer controller portion 103. If the engine control portion 150 is ready for printing, this signal has a value of "TRUE". In the case that the engine control portion 150 is not ready for printing, the /RDY signal 172 has a value of "FALSE".

Further, /PRNT signal 173 indicates a request for printing issued from the printer controller portion 103 to the engine control portion 150, and is transmitted from the printer controller portion 103 to the engine control portion 150.

Furthermore, /VSREQ signal 174 indicates a request for a vertical synchronization signal issued from the engine control portion 150 to the printer controller portion 103, and is transmitted from the engine control portion 150 to the printer controller portion 103. Additionally, /VSYNC signal 175 is a vertical synchronization signal outputted by the printer controller portion 103 to the engine control portion 150 and is transmitted from the printer controller portion 103 to the engine control portion 150. /BD signal 676 is a horizontal synchronization signal and is transmitted from the engine control portion 150 to the printer controller portion 103.

Further, /SCLK signal 678 is a synchronous clock signal for serial communication and is transmitted from the printer controller portion 103 to the engine control portion 150. Moreover, /CMD signal 179 is a command sent from the printer controller portion 103 to the engine control portion 150, and is transmitted from the printer controller portion 103 to the engine control portion 150. Furthermore, /CBSY signal 180 is a strobe signal for outputting a command and is transmitted from the printer controller portion 103 to the engine control portion 150.

In addition, /STS signal 181 is the status of the inside of the printer engine portion 105 and is transmitted from the engine control portion 150 to the printer controller portion 103 as an output thereof in response to a command from the printer controller portion 103. Further, /SBSY signal 182 indicates status output period and is transmitted from the engine control portion 150 to the printer controller portion 103.

A /CCRT (Condition Change Report) signal 177 is a signal whose value becomes "TRUE" when the status of the printer engine portion 105, other than status directly related to the /RDY signal 172, changes. Thus, when /CCRT signal 177 goes "TRUE", it informs the printer controller portion 103 of the change (hereunder referred to as "condition change") in the contents of the aforementioned status. The /CCRT signal 177 is transmitted from the engine control portion 150 to the printer controller portion 103. When no condition change occurs, the /CCRT signal 177 has a value of "FALSE". Processing to be performed by the printer controller portion 103 based on the /RDY signal 172 and the /CCRT signal 177 will be described later.

Figure 4:
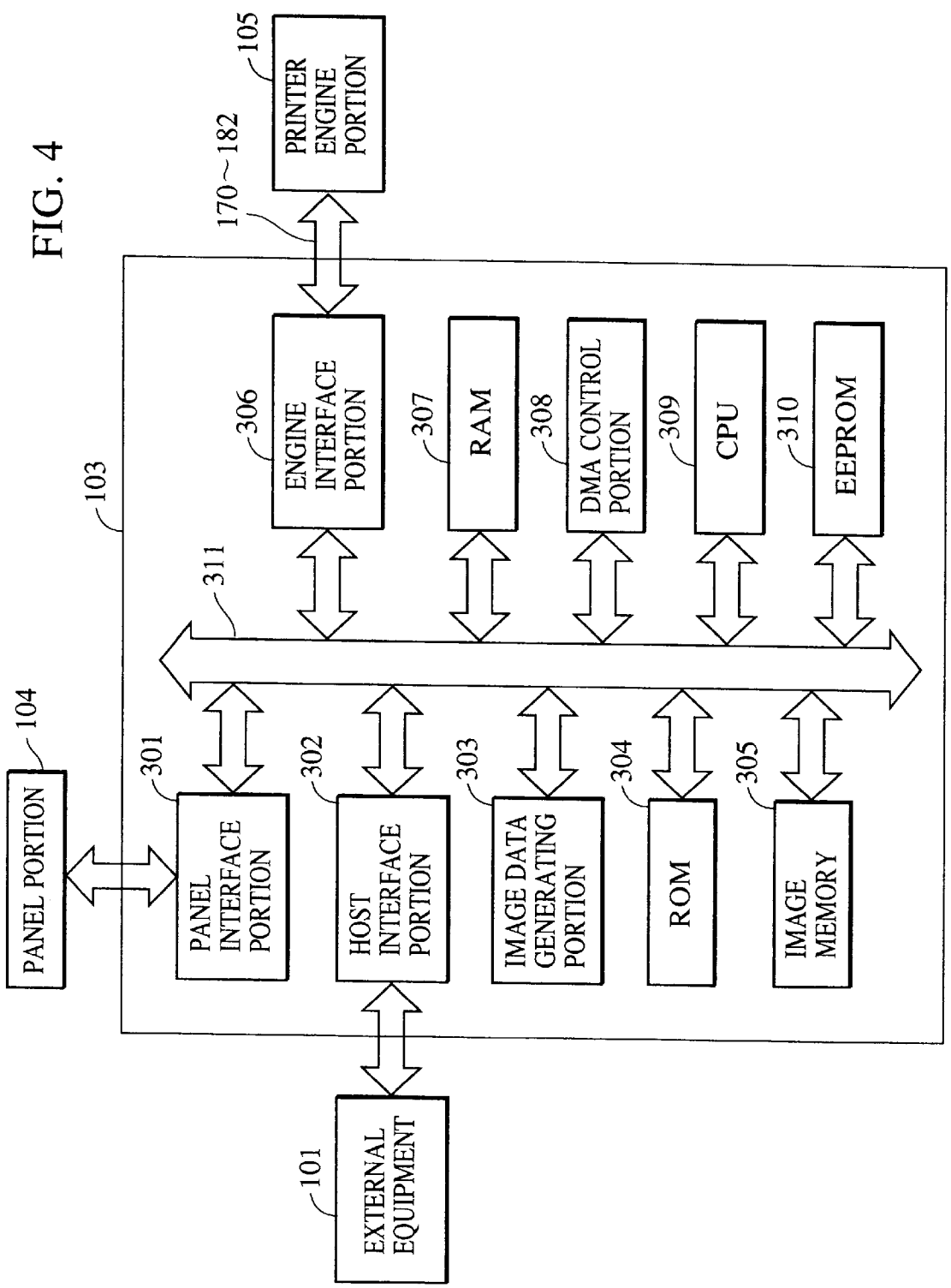
FIG. 4 is a block diagram illustrating the detailed configuration of the printer controller portion of the image forming apparatus of FIG. 1.

FIG. 4 is a block diagram illustrating the configuration of the printer controller portion 103. The printer control portion 103 comprises a panel interface (I/F) portion 301, a host interface (I/F) portion 302, an image data generating portion 303, a ROM (namely, a read-only memory) 304, an image memory 305, an engine interface (I/F) portion 306, a RAM (namely, a random access memory) 307, a DMA (namely, a direct memory access) control portion 308, a CPU (namely, a central processing-unit) 309, and an EEPROM (namely, an electrically erasable and programmable ROM) 310. These composing elements are connected with one another through a system bus 311, which has an address bus and a data bus, in such a manner as to be able to be accessed by one another.

The panel interface portion 301 receives information concerning various settings and instructions, which are inputted by an operator, from the panel portion 104 connected to the panel interface portion 301 by performing a data communication with the portion 104. The host interface portion 302 is an input/output portion used when transmitting signals to and receiving signals from the external equipment 101 connected to the host interface portion 302. The engine interface portion 306 is an input/output portion used when transmitting signals to and receiving signals from the printer engine portion 105 connected to the engine interface portion 306. This engine interface portion 306 is operative to transmit data signals from an output buffer register and to control communications (namely, detect signals flowing through signal lines respectively corresponding to the /CPRDY signal 170 to the /SBSY signal 182 of FIG. 3 and drive these signal lines) with the printer engine portion 105.

The CPU 309 is operative to control the entire printer controller portion 103 according to a control code stored in the ROM 304. At that time, the RAM 307 is used as a work area for temporarily storing the control code.

The image data generating portion 303 is operative to generate bit map data, which is used for actually printing data, according to the control code data transmitted from the external equipment 101.

The image memory 305 is operative to store image data to be used as the bit map data. Further, the EEPROM 310 is a nonvolatile memory. The DMA control portion 308 is operative to transfer the bit map data, which is stored in the image memory 305, to the engine interface portion 306 in accordance with an instruction issued by the CPU 309.

Figure 5:
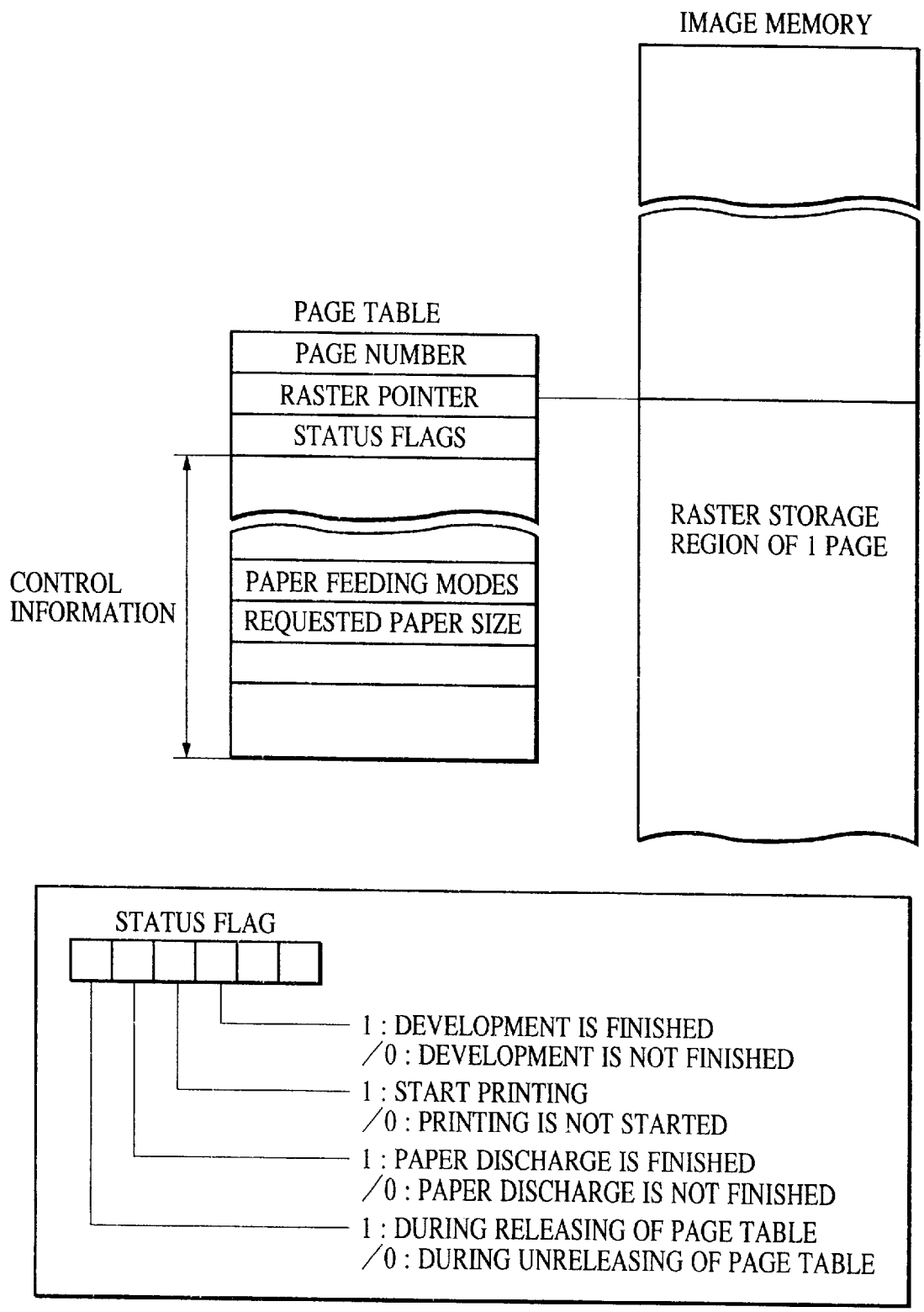
FIG. 5 is a conceptual diagram illustrating the configuration of a page table stored in a random access memory (RAM) of the image forming apparatus of FIG. 1.

FIG. 5 is a conceptual diagram illustrating the configuration of a page table. In this context, the page table is a table used by the CPU 309 for logically recognizing a page, the page table is stored in the control information storage area in the RAM 307 as a continuous region, and the page table is acquired and freed by a management function portion (not shown).

In this figure, "PAGE NUMBER" designates a number assigned to each page; and "RASTER NUMBER" a leading pointer corresponding to an area of one page in the image memory 305. The CPU 309 is operative to partition a predetermined area of the image memory 305 into pages at initialization after turning on the power, and further link such a partitioned area with the "RASTER POINTER".

Further, each "STATUS FLAG" is a flag indicating the status of a page. As shown in a lower part of this figure, a "DEVELOPMENT FINISHING FLAG", a "PRINT STARTING FLAG", "PAPER-DISCHARGE FINISHING FLAG" and A "DURING-RELEASE FLAG" are established as the "STATUS FLAGS".

Moreover, a "PAPER DISCHARGE MODE" is established in accordance with a decision made by and an instruction given by the paper feed portion. Although not shown in this figure, an "AUTOMATIC PAPER FEED" mode, a "CASSETTE 1 PAPER FEED" mode (corresponding to the cassette 210), a "CASSETTE 2 PAPER FEED" mode (corresponding to the cassette 250) and a "MP TRAY PAPER FEED" mode (corresponding to the multiple purpose tray) are employed as "PAPER FEED MODES". Here, note that the "AUTOMATIC PAPER FEED" mode is a mode in which a paper feed portion is searched for and selected from among plural paper feed portions each containing sheets of paper, the selected paper feed portion corresponding to paper whose size is equal to a desired paper size.

Furthermore, the information "REQUESTED PAPER SIZE" designates a value of the size of paper, the feeding of which is requested to the printer engine portion 105.

The page table is referred to or updated by various tasks including an analysis development task, a page operation task, and an engine monitoring task, as described more fully below.

Figure 6:
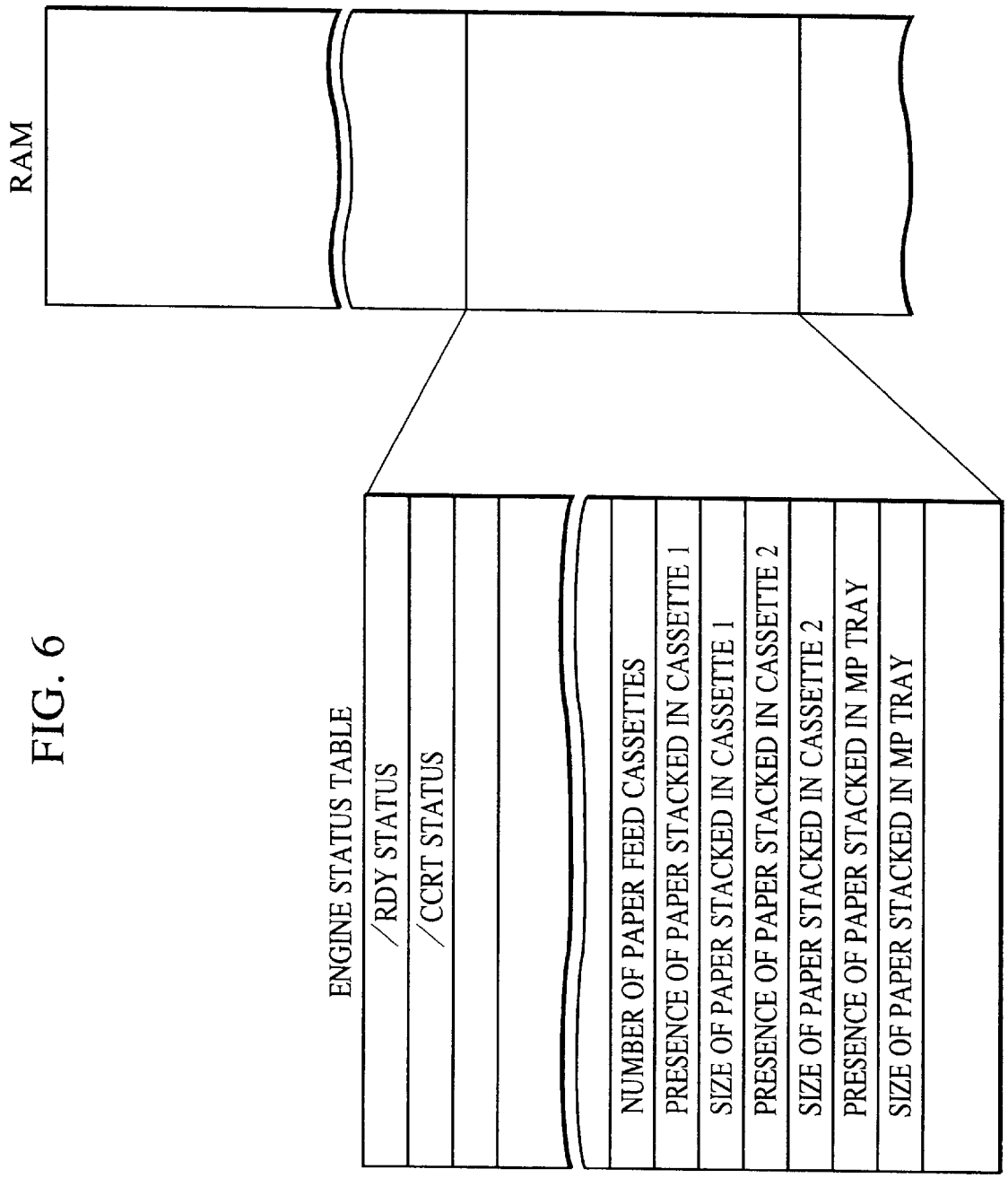
FIG. 6 is a conceptual diagram illustrating the configuration of an engine status table stored in the RAM of the image forming apparatus of FIG. 1.

FIG. 6 is a conceptual diagram illustrating the configuration of the engine status table. Here, note that the engine status table indicates the status of the printer engine portion 105, which is recognized or known by the printer controller portion 103 (as a current status thereof), and is stored in the RAM 307. Thus, the status indicated by this engine status table is not always the same as an actual state of the printer engine portion 105 but is updated by performing engine monitoring tasks described below to thereby reflect the status of the printer engine portion 105 with the predetermined timing. As a result of this reflecting and updating, the recognition of the status of the printer engine portion 105 is achieved by the engine monitoring task.

In this figure, a flag "/RDY STATUS" reflects the status of the /RDY signal 172. During detection of a value of "FALSE" of the /RDY signal 172 by the engine monitoring task, this flag also has a value of "FALSE".

Further, another flag "/CCRT STATUS" reflects the status of the /CCRT signal 177. This flag reflects the actual status of the /CCRT signal 177 by performing the engine monitoring task. As will be described later, during detection of a value of "TRUE" for the /CCRT signal 177 by performing the engine monitoring task, the status of the printer engine portion 105 is acquired by performing a predetermined serial communication, and the /CCRT signal 177 is reset to thereby have a value of "FALSE".

Moreover, still another flag "NUMBER OF PAPER FEED CASSETTES" reflects the status of option cassette units fitted into the apparatus and thus indicates the number of selectable paper feed cassettes.

Furthermore, flags "PRESENCE OF PAPER STACKED IN CASSETTE 1" and "PRESENCE OF PAPER STACKED IN CASSETTE 2" indicate whether or not sheets of paper are present in the cassette 210 and whether or not sheets of paper are present in the cassette 250, respectively. Additionally, flags "SIZE OF PAPER STACKED IN CASSETTE 1" and "SIZE OF PAPER STACKED IN CASSETTE 2" indicate the paper sizes of paper to be stored in the paper cassettes 210 and 250, respectively.

Such a paper size of paper to be stored in each paper cassette is set by an operator by using a dial (not shown). The paper size of paper stored in each of the paper cassettes is recognized by assuming that sheets of paper, whose paper size is the same as the set paper size, are normally stored in each of the paper cassettes 210 and 250.

The engine status table is referred to or updated by performing the analysis development task, the page operation task, and the engine monitoring task.

Figure 7:
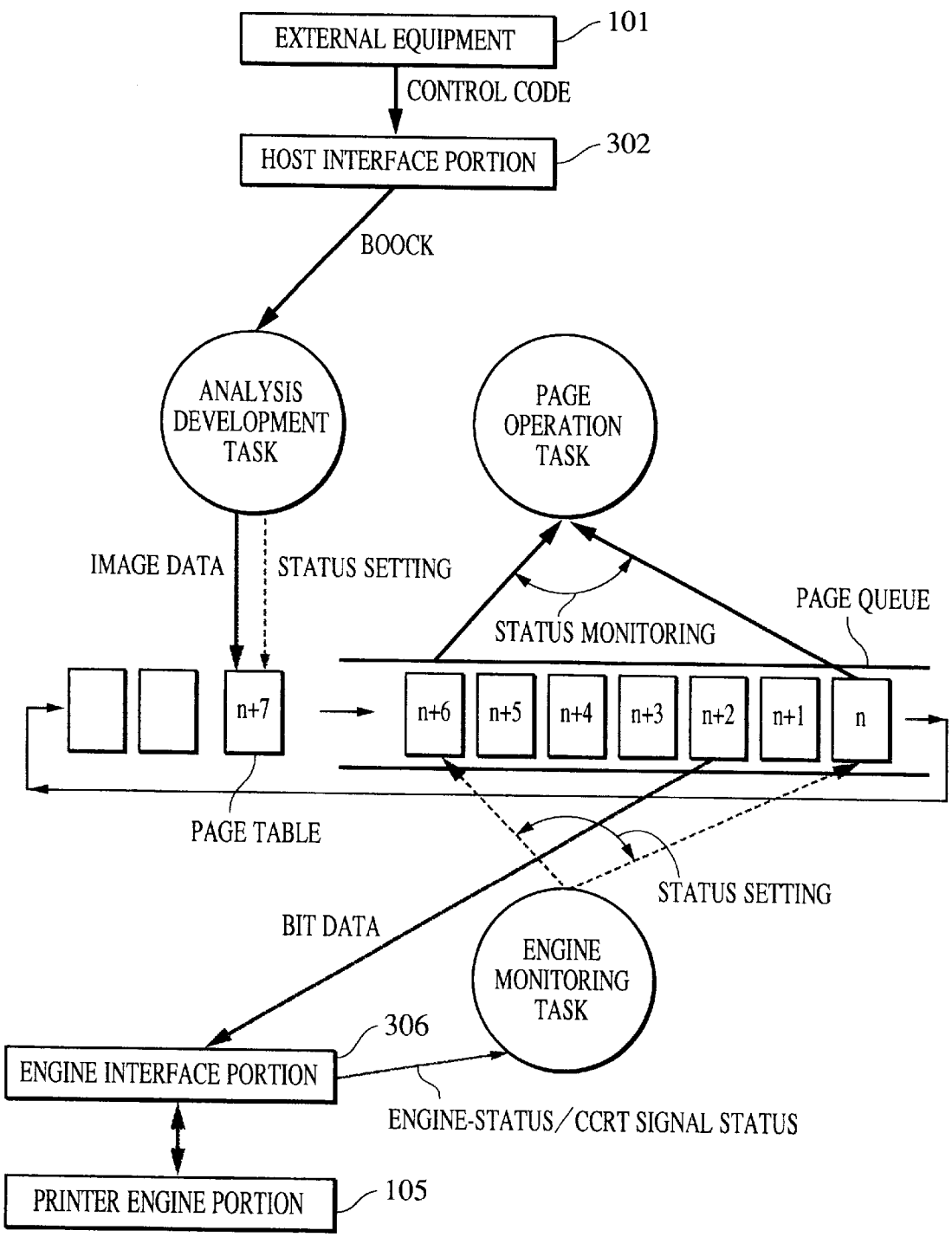
FIG. 7 is a diagram illustrating the flow of data in the image forming apparatus of FIG. 1.

FIG. 7 is a diagram illustrating the flow of data in this image forming apparatus embodying the present invention, namely, this embodiment of the present invention. Control code, which is used for a control operation performed by the CPU 309, forms an OS (namely, an Operating System), by which time sharing control operations are performed on various executable load modules, by using a system clock (not shown), so that a plurality of load modules are time-sharingly executed, each in such a way as to perform an operation in a functional unit.

The tasks to be accomplished in this embodiment are an analysis development task, a page operation task, and an engine monitoring task. These are performed logically in parallel with one another.

First, data such as printing data (for example, the control code and the PDL (page description language)) inputted from the external equipment 101 to the host interface portion 302 is stored in the host interface portion 302 in the units of a predetermined number of blocks. In the case of the analysis development task, which is described in more detail in connection with FIG. 8, when it is detected that data is stored in the host interface portion 302, the aforementioned page table is acquired from the host interface portion 302. Then, an analysis operation is performed on each unit of the data, that is, every block of the predetermined number. In the case that the data is image data such as image forming information (for instance, information concerning a picture description instruction of the PDL and a character code), image development is performed by using the image data generating portion 303 or the CPU 309 itself. Further, in the case that the analyzed data is control data or information (concerning, for example, the number of copies and the selection of the paper feed portion) for the printer engine portion 105, this data is stored in the page table. Upon completion of the analysis and development of the data of one page, among the "STATUS FLAGS", the value of the flag "DEVELOPMENT FINISHING FLAG" is changed to "TRUE". Moreover, the aforementioned page table is enqueued on a page queue that is an FIFO (a first in first out) queue.

In the case of the page operation task, which is described in more detail in connection with FIG. 9, the "STATUS FLAGS" of all pages queued in the page queue are simultaneously monitored. Further, a printing operation is performed by changing the procedure of conveying sheets of paper according to the monitored status. At that time, the setting of the paper feed portion for the printer engine portion 105 is actually performed by the engine interface portion 306. A page table, for which a corresponding "PAPER-DISCHARGE FINISHING FLAG" has a value of "TRUE", is dequeued from the page queue and is put back to a page management function portion (not shown).

In the case of the engine monitoring task, which is described in more detail in connection with FIG. 10, the CPU 309 communicates with the printer engine portion 105 through the engine interface portion 306 at a predetermined period. In the case that a factor changing the status of a page occurs, the "STATUS FLAG" is updated. Further, /RDY signal 172 is monitored. When the value represented by the /RDY signal 172 changes from "TRUE" to "FALSE", the status of the printer engine portion 105 is changed to "DURING ERROR OCCURS". Moreover, it is monitored whether or not an error recovery is achieved. Furthermore, the /RDY signal 172 and the /CCRT signal 177 are monitored. Then, a predetermined procedure described below is followed according to the monitored status to thereby perform a process of updating the engine status table.

As above stated, information concerning the designation of an operating mode (such as the designation of the numbers of copies and a paper feed portion to be selected) from the panel portion 104 is once stored in the panel interface portion 301. Here, note that in the case of a printer control task (not shown), the panel interface portion 301 is cyclically monitored at suitable intervals, that when data is present in the panel interface portion 301, this data is stored in the EEPROM 310, and that thereby, even after the power supply for the laser beam printer is once turned off, the laser beam printer 102 can be operated in a user's desired mode.

Figure 8:
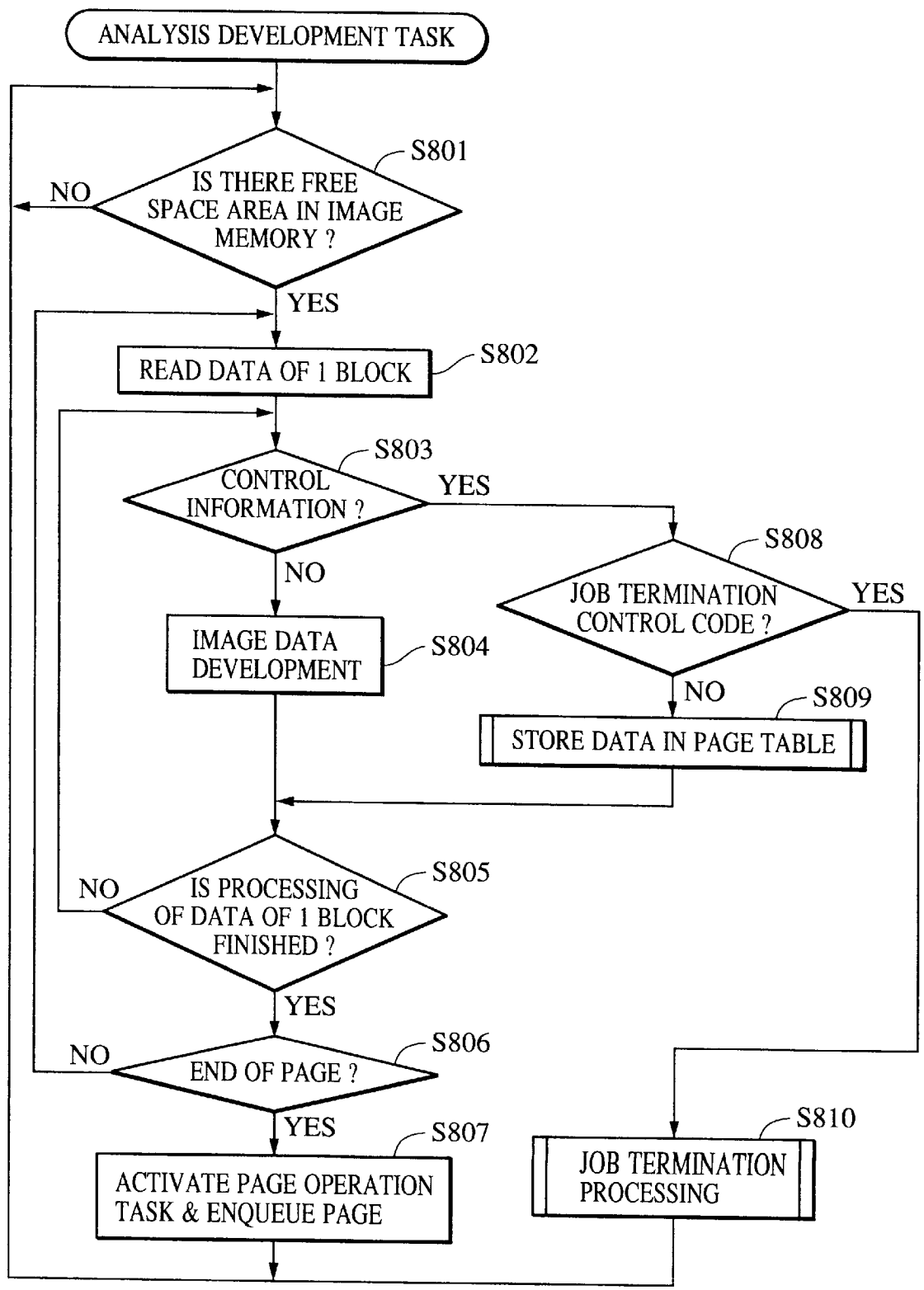
FIG. 8 is a flowchart illustrating the procedure of an analysis development processing which corresponds to an analysis development task performed in the image forming apparatus of FIG. 1.

FIG. 8 is a flowchart illustrating the control procedure that results when code for an analysis development process which corresponds to an analysis development task performed in this image forming apparatus is executed. This process is performed by the CPU 309 based on code in ROM 304 for the analysis development task.

When the analysis development task is activated in the case that the power supply for the laser beam printer 102 is turned on, the CPU 309 first makes an inquiry about an occurrence of a data reception and about a free space in the image memory 305 at the host interface portion 302 at an appropriate period. Thus, it is judged (in step S801) whether or not data is present in the host interface portion 302 and whether or not there is a free space in the image memory 305.

The CPU 309 advances to step S802 only when it is found as a result of the judgement that data is present in the host interface portion 302 and that there is a free space in the image memory 305. Otherwise, flow returns to step S801 where the judgement is continued.

Next, in step S802, the page table is acquired and data of one block is read from the host interface portion 302, in which the data is stored in the units of the predetermined number of blocks, into the work area for the CPU 309, which is provided in the RAM 307.

In the subsequent step S803, it is judged whether or not the read data represents control information. If not, meaning the read data is image data, the image data is developed (in step S804). This development of the image data is performed by requesting the image data generating portion 303 to develop it or by the CPU 309 itself. Moreover, the developed image data is stored in a predetermined area of the image memory 305.

Further, in the subsequent step S805, it is judged whether or not the analysis processing of the data of one block is finished. If not, the CPU 309 returns to step S803. In contrast, if finished, it is judged (in step S806) whether or not an end-of-page code is detected. As a result of the judgement, if not detected, the CPU 309 returns to step S802. In contrast, if detected, the page operation task is activated by request to the OS. Then, the page table is enqueued on the page queue (in step S807), and CPU 309 returns to step S801.

On the other hand, if as a result of the aforementioned step S803 it is found that the read data represents the control information, it is judged (in step S808) whether or not the control information represents a job termination control code. As a consequence of this judgement, if not, the data is stored in the page table through a predetermined conversion process (in step S809).

On the other hand, if as a result of the judgement performed in the aforementioned step S808 it is found that the control information represents a job termination control code, CPU 309 performs predetermined job termination processing (in step S810). Then, the CPU 309 returns to step S801.

Figure 9:
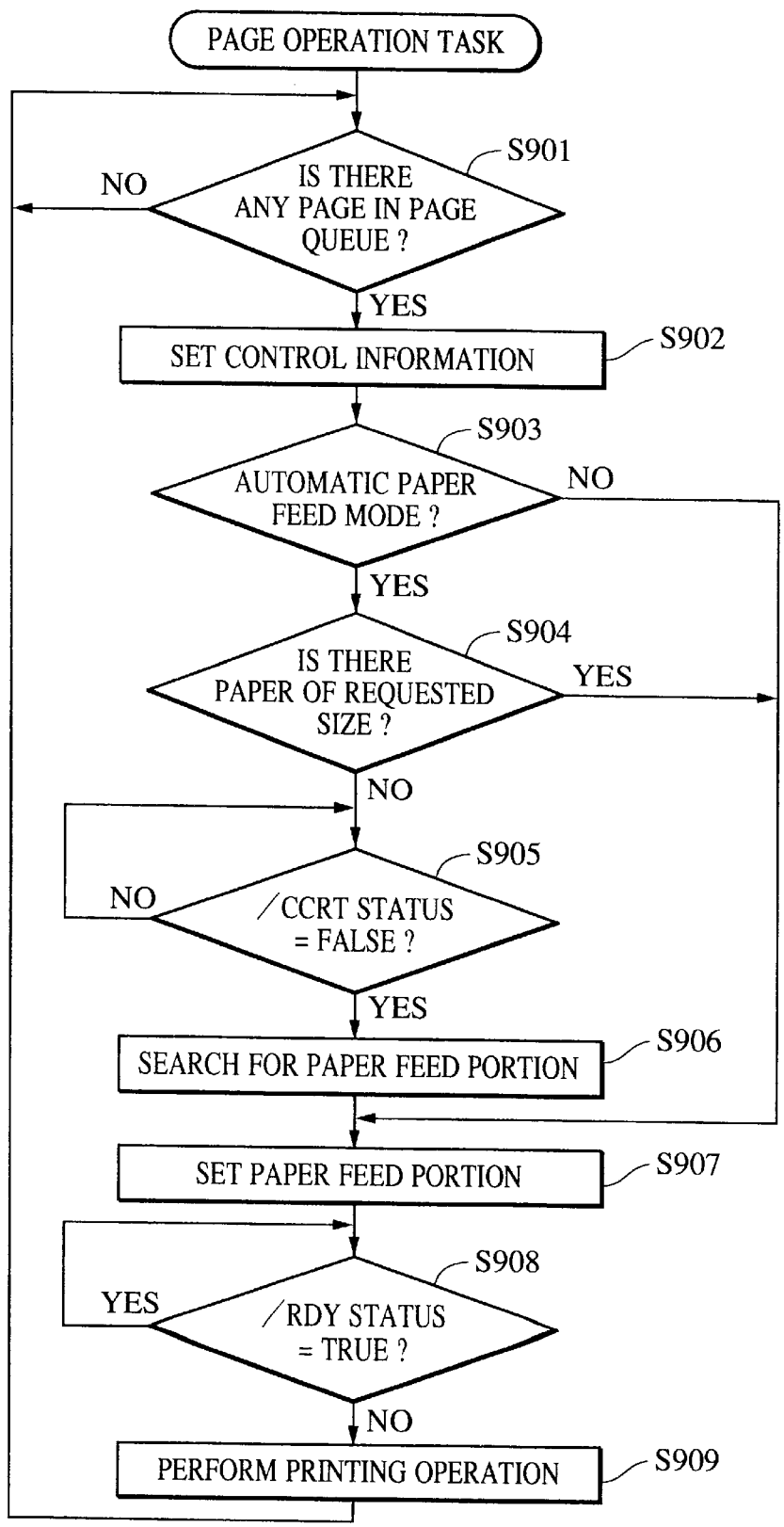
FIG. 9 is a flowchart illustrating the procedure of a page operation processing which corresponds to a page operation task performed in the image forming apparatus of FIG. 1.

FIG. 9 is a flowchart illustrating the control procedure that results when code for a page operation process which corresponds to a page operation task performed in this image forming apparatus is executed. This process is performed by the CPU 309 based on code in ROM 304 for the page operation task.

When the page operation task is activated in the case that the power supply for the laser beam printer 102 is turned on, it is first judged by monitoring the page queue at predetermined periods (in step S901) whether or not a page is present on the page queue. If not, such a judgement is continued. In contrast, if a page is present on the page queue, the control information corresponding to the page table to be printed is actually set in the printer engine portion 105 (in step S902).

In the subsequent step S903, it is judged whether or not a printing mode is the "AUTOMATIC PAPER FEED MODE". As a result of the judgement, if it is found that the printing mode is the "AUTOMATIC PAPER FEED MODE", it is further judged (in step S904) whether or not sheets of paper whose size is equal to the "requested paper size" are stored in the paper feed portion currently set in the printer engine portion 105. As a result of the judgement, if it is found that the sheets of paper whose size is equal to the "requested paper size" are not stored therein, it is judged (in step S905) whether or not the "/CCRT STATUS" is "FALSE". IF "TRUE", this judgment is continued. In contrast, if "FALSE" (when the engine monitoring task acquires the status of the printer engine portion 105 by performing a serial communication, the "/CCRT STATUS" is set to "FALSE"), the CPU 309 advances to step S906 whereupon the paper feed portions are searched by performing a predetermined process according to the flags "PRESENCE OF PAPER STACKED IN CASSETTE 1" and "SIZE OF PAPER STACKED IN CASSETTE 1" stored in the engine status table and the flag "REQUESTED PAPER SIZE" stored in the page table. The paper feed portion searched for is set in the printer engine portion 105 as a selected paper feed portion (in step S907).

In contrast, in the case where it is found in the step S903 that the printing mode is not the "AUTOMATIC PAPER FEED MODE", and in the case where it is found in step S904 that the sheets of paper whose size is equal to the "requested paper size" are stored therein, the CPU 309 advances directly to step S907.

In such cases, the setting of the paper feed portion in step S907 is performed as the occasion demands. For instance, if the printing mode is not the "AUTOMATIC PAPER FEED MODE", the paper feed portion corresponding to the "PAPER FEED MODE" in the page table is set in the printer engine portion 105.

In the subsequent step S908, it is judged whether or not the "/RDY STATUS" stored in the engine status table is "TRUE". If "FALSE", this judgement is continued. If "TRUE", a printing operation is performed (in step S909). Next, the CPU 309 returns to step S901 so as to refer to a page table to be printed.

Figure 10:
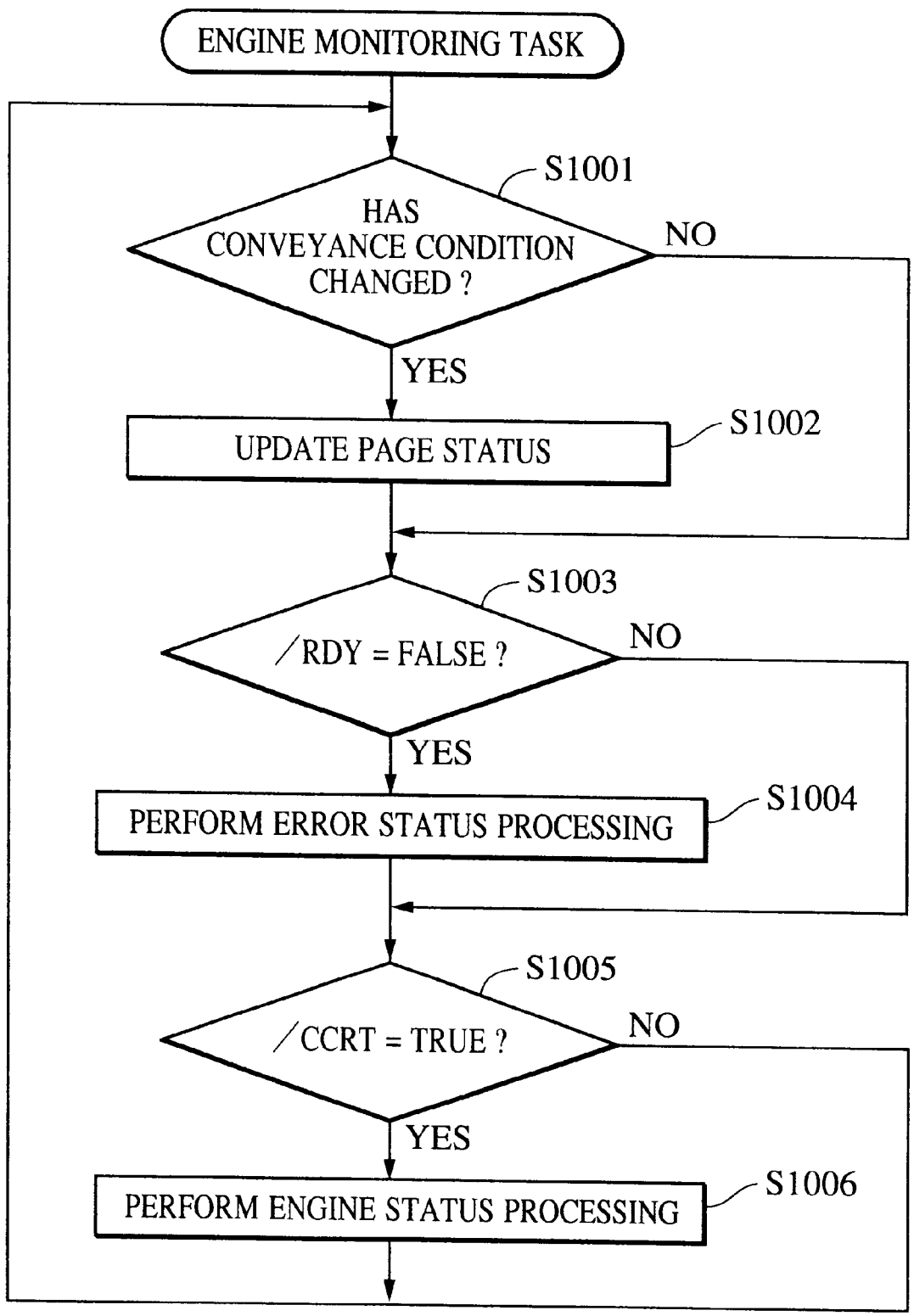
FIG. 10 is a flowchart illustrating the procedure of an engine monitoring processing which corresponds to an engine monitoring task performed in the image forming apparatus of FIG. 1.

FIG. 10 is a flowchart illustrating the control procedure that results when code for an engine monitoring process which corresponds to an engine monitoring task performed in this image forming apparatus is executed. This process is performed by the CPU 309 based on code in ROM 304 for the engine monitoring task.

When the engine monitoring task is activated in the case that the power supply for the laser beam printer 102 is turned on, the following process is performed periodically and repeatedly. First, by assuming that the laser beam printer 102 is performing a printing operation, the CPU 309 inquires of the printer engine portion 105 and judges (in step S1001) whether or not the paper conveyance condition changes As a result of the judgement, if the paper conveyance situation changes, the "STATUS FLAG" corresponding to the page concerned, which is stored in the page table, is updated (in step S1002). Then, the CPU 309 advances to step S1003. In contrast, if no change occurs in the paper conveyance condition, the CPU 309 advances directly to step S1003.

In the subsequent step S1003, the CPU 309 makes an inquiry about the /RDY signal 172 and changes the "/RDY STATUS" stored in the engine status table to reflect the status of the /RDY signal 172. Moreover, the CPU 309 judges whether or not the /RDY signal 172 has a value of "FALSE". If "FALSE", the CPU 309 advances to step S1004. Then, the following process is performed.

First, if the /RDY signal 172 has a value of "FALSE", the CPU 309 reads information representing the status of the printer engine portion 105. At that time, the CPU 309 refers to the /CCRT signal 177. If the CCRT signal 177 has a value of "FALSE", the CPU 309 checks the contents of the status, which are, for instance, a misprinting status, a waiting status, a sleeping status, and an operator calling status. Further, a lower-order status corresponding to each bit is referred to according to a result of the checking. Detailed status is thus verified. Thereafter, a predetermined recovery waiting process is performed. In this recovery waiting process, an operator performs the following predetermined operations, namely, an operation of reselecting a paper feed portion, a jam recovery operation, and a door closing operation. Then, the CPU 309 waits for the restoration of the value, which is represented by the /RDY signal 172, to "TRUE". Subsequently, the CPU 309 advances to step S1005 after the value, which is represented by the /RDY signal 172, becomes "TRUE".

In contrast, if it is found in step S1003 that the /RDY signal 172 has a value of "TRUE", the CPU advances directly to step S1005.

In step S1005, the CPU 309 makes an inquiry about the /CCRT signal 177 and causes the "/CCRT STATUS", which is stored in the engine status table, to reflect the status of the /CCRT signal 177. Moreover, the CPU 309 judges whether or not the /CCRT signal 177 has a value of "TRUE". As a result of the judgement, if it is found that the /CCRT signal 177 has a value of "TRUE", the CPU 309 goes forward to step S1006. Then, the CPU 309 performs the following process.

First, in the case that the /CCRT signal 177 has a value of "TRUE", the CPU 309 reads status information, which concerns the alterations of the paper size, the state of the presence or absence of the paper in the paper feed portion, the function of the paper feed portion, and the contents of the warning, by performing a serial communication. Further, the CPU 309 recognizes the kinds of the altered status. Moreover, the CPU 309 serially reads the statuses of such kinds. Thereby, the CPU obtains the detailed state of the engine. Furthermore, the corresponding parts of the engine status table are updated to reflect the state of the engine thus obtained. Thereby, the engine status table is updated.

For example, when it is detected in the printer engine portion 105 that there is no sheet of paper in the cassette 210, the printer engine portion 105 changes the inner status thereof into "ABSENCE OF PAPER STACKED IN CASSETTE 210". The printer engine portion 105 also changes the value represented by the /CCRT signal 177 to "TRUE". The printer controller portion 103 uses the change in the value, which is represented by the /CCRT signal 177, to "TRUE" as a trigger and performs a serial communication with the printer engine portion 105. Furthermore, the value of the status "PRESENCE OF PAPER STACKED IN CASSETTE 1" is updated to "FALSE" by performing the engine monitoring task to update the engine status table. Thereby, the printer controller portion 103 recognizes the change in the state of sheets of paper stored in the cassette 210 so as to recognize the fact that a paper out condition has occurred in the cassette 210.

Furthermore, the /CCRT signal 177 is reset after the status of the printer engine portion 105 is recognized. Namely, the engine control portion 150 checks the change in the terminal status, for example, the alteration of the paper size, the change in the presence or absence state of the stored paper, the alteration of the function of the paper feed portion and the change in the warning state at all times. In the case that one of such alterations or changes occurs, a change flag, which indicates an occurrence of a change in the corresponding higher-order condition change status by having a value of "1", is set at a value of "1". Moreover, the value represented by the /CCRT signal 177 serving as a hard signal is set at a value of "TRUE". Thereafter, when the CPU 309 receives a status request command from the printer controller portion 103 and further, the condition change status is read by the printer controller portion 103, the value represented by the /CCRT signal 177 is reset by engine control portion 150 to "FALSE".

After the aforementioned processing in step S1006, or in the case that it is found in step S1005 that the value represented by the /CCRT signal 177 is "FALSE", the CPU returns to step S1001.

In the case of the first embodiment of the present invention, a change in the /CCRT signal 177 can be used as a trigger for the printer controller portion 103 to make an inquiry about the status at the printer engine portion 105. Unless this trigger is generated (namely, the value represented by the /CCRT signal 177 becomes "TRUE"), there is no necessity of performing a serial communication between the printer engine portion 105 and the printer controller portion 103. This ordinarily eliminates, for example, the need for making an inquiry about the status of the paper feed portion by actually performing a serial communication at the time of searching the paper feed portions. Thus, processing overhead is reduced. Moreover, a larger part of the essential ability or power of the printer controller portion 103 can be applied to the image drawing processing. Thus, the full printing performance of the printer engine portion 105 can be easily brought out. Consequently, the throughput of the apparatus is enhanced, and high-speed communication is achieved. Furthermore, the burden imposed on the engine control portion 150 is decreased.

Second Embodiment

Figure 11:
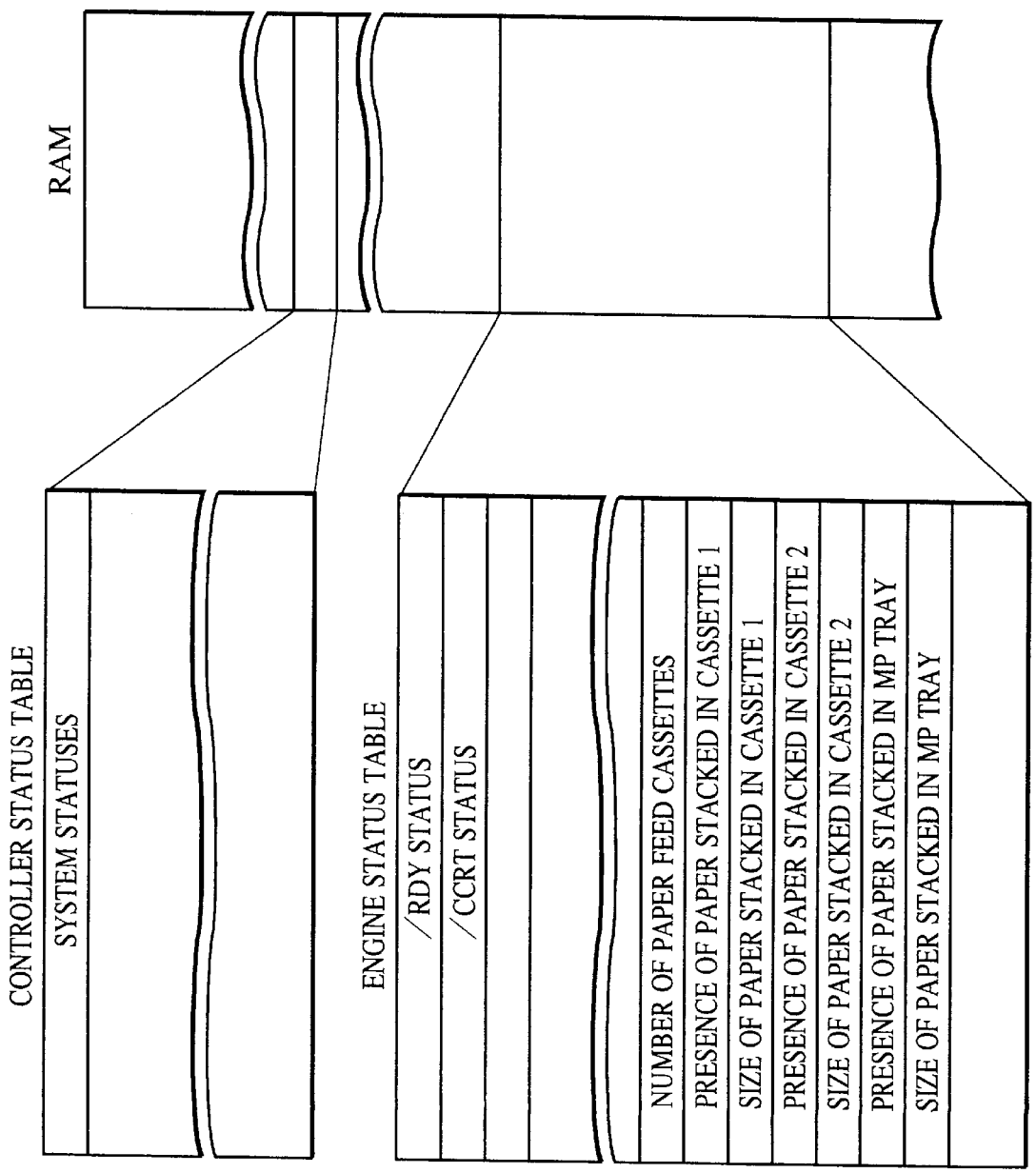
FIG. 11 is a conceptual diagram illustrating the structures of an engine status table and a controller status table, which are stored in the RAM of another image forming apparatus that is a second embodiment of the present invention.
Figure 12:
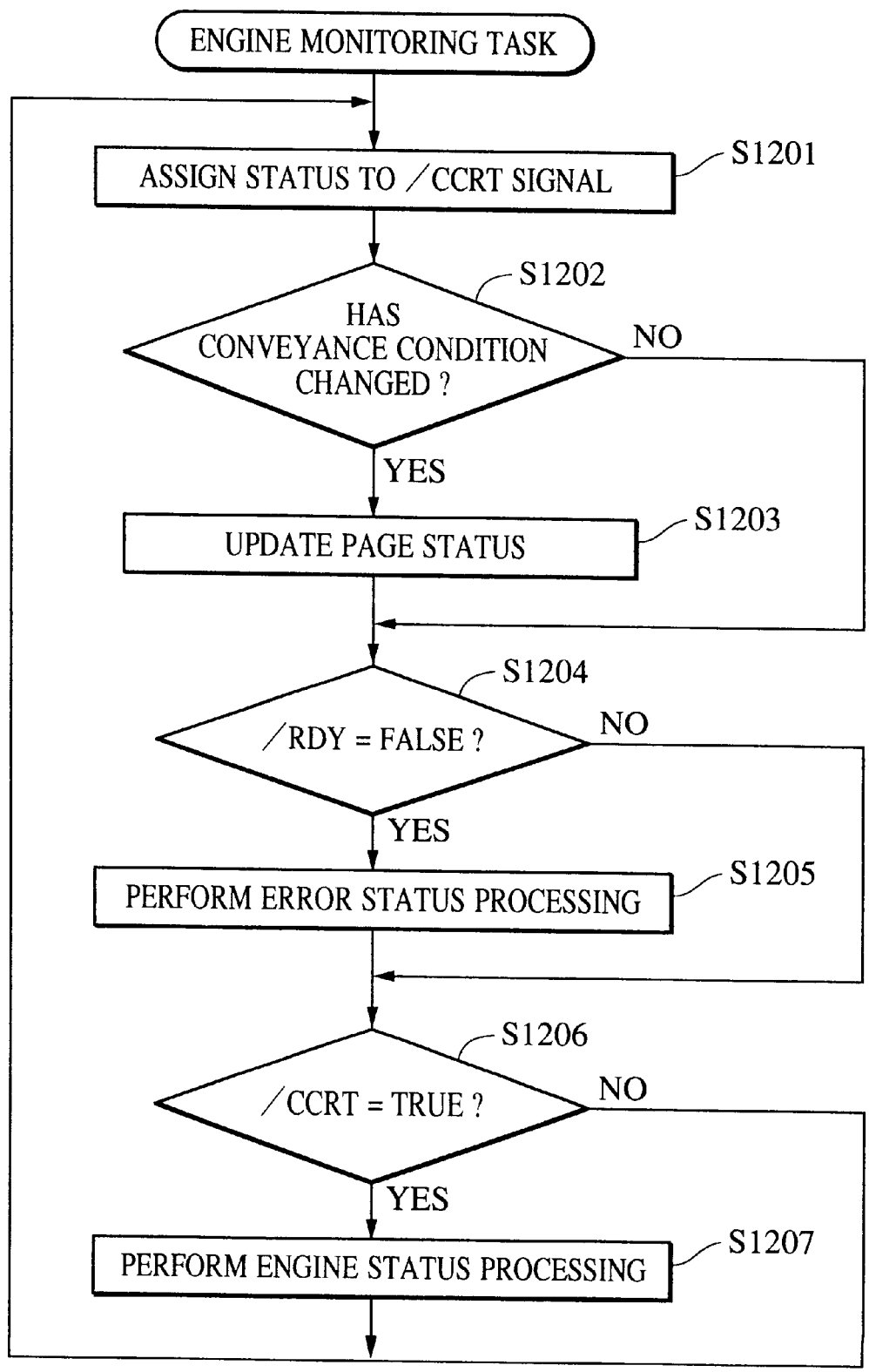
FIG. 12 is a flowchart illustrating the procedure of an engine monitoring processing which corresponds to an engine monitoring task performed in this image forming apparatus, namely, a second embodiment of the present invention.

A second embodiment of the present invention will now be described. This embodiment has a configuration which is basically the same as that of the first embodiment of the present invention, but it is different from the first embodiment in that the status assigned to the /CCRT signal 177 is preliminarily designated. Therefore, in the case of this second embodiment, the configuration thereof is established as illustrated in FIGS. 1 to 4. Further, the page table is provided as illustrated in FIG. 5. However, the engine status table is illustrated in FIG. 11, instead of FIG. 6. Furthermore, the flow of data is illustrated in FIG. 7. Moreover, the analysis development task is illustrated in FIG. 8. The page operation task is illustrated in FIG. 9. The engine monitoring task is illustrated in FIG. 12, in place of FIG. 10. In FIGS. 11 and 12, like reference numerals designate the same composing elements as those in the first embodiment.

The /CCRT signal 177 in the second embodiment of the present invention is a signal adapted to have a value of "TRUE" when a command sent from the printer controller portion 103 by using a serial communication causes a change in preliminarily designated items among the contents of the statuses, which do not directly relate to the /RDY signal 172, used for informing of the aforementioned change. Thus, the /CCRT signal 177 informs of the fact that the conditions in the contents of the aforementioned statuses are changed.

FIG. 11 is a block diagram illustrating the structures of an engine status table and a controller status table used in this second embodiment of the present invention. These tables are stored in the RAM 307.

In this figure, the controller status table is a table in which data or information representing the operating condition of the printer controller portion 103 is stored. Namely, this table is used for storing data or information representing the status of the entire laser beam printer 102, from a user's point of view. In this table, a "DURING INITIALIZATION" status (not shown), a "DURING IDLING" status (not shown), a "DURING PRINTING" status (not shown) and a "DURING POWER-THRIFTY STANDBY" status (not shown) are employed as the "SYSTEM STATUSES".

The engine status table shown in FIG. 11 is the same as that described in FIG. 6.

FIG. 12 is a flowchart illustrating the control procedure that results when code for an engine monitoring process which corresponds to an engine monitoring task is executed. This process is performed by the CPU 309 based on code in ROM 304 for the engine monitoring task.

When the engine monitoring task is activated in the case that the power supply for the laser beam printer 102 is turned on, the aforementioned "SYSTEM STATUSES" of FIG. 11 is referred to in step S1201. Among the statuses of the printer engine portion 105, the statuses to be assigned to the /CCRT signal 177 are determined according to the status referred to as above stated. Further, the determined statuses are actually set in the printer engine portion 105.

In the subsequent steps S1202 through S1207, the CPU 309 performs operations which are similar to those performed in steps S1001 to S1006 of FIG. 10.

FIG. 13 is a table which lists the statuses to be assigned to the /CCRT signal 177 in step S1202 of the process of FIG. 12. Data representing the contents of this table is stored in the ROM 304 together with the control code.

In this figure, for example, the statuses "TONER LOW", "PRESENCE-OF-PAPER STACKED IN CASSETTE 1 (or 2)" and "PAPER SIZE" are assigned to the /CCRT signal 177 during idling. Only the status "PRESENCE OF PAPER" is assigned to the /CCRT signal 177 during printing. Therefore, for instance, when the value represented by the /CCRT signal 177 is changed to "TRUE" when the printer controller portion 103 is performing a printing operation, the CPU 309 immediately recognizes the fact that a paper out condition occurs. This obviates the necessity of searching the status by using a needless serial communication.

In the case of the second embodiment of the present invention, advantages or effects, which are similar to those of the first embodiment of the present invention, are obtained. In addition, by designating the statuses assigned to the /CCRT signal 177 according to the operating condition of the printer controller portion 103, the statuses concerning the designated items can be recognized without performing a serial communication. Further, by appropriately utilizing the /CCRT signal 177 according to the condition of the printer controller portion 103, the reduction in the cost of the apparatus due to the decrease in the number of signal lines is achieved. Moreover, the recognition of the statuses is speeded up. Consequently, the maximum information efficiency is obtained by employing the minimum number of signal lines.

It is possible to store the contents of the table of FIG. 13 in RAM 307 as elements of the printer status table, instead of using the ROM 304. In this case, initial values are loaded from the ROM 304 by performing a printer control task (not shown) when turning on the power. Further, the printer control task is performed so as to communicate with the panel portion 104 in logical level and to integratively manage operations which are performed by executing load modules in the printer controller portion 103.

Furthermore, the apparatus is configured so that the contents of the table of FIG. 13 can be altered in accordance with predetermined control instructions sent from the panel portion 104 or the external equipment 101. Thereby, during the power-thrifty standby, the statuses assigned to the /CCRT signal 177 can be set in accordance with instructions or commands sent from the panel portion 104 or the external equipment 101. Thereby, a user can easily determine the conditions for transition from the power-thrifty standby state to another state (usually, an idling state).

Third Embodiment

Figure 14:
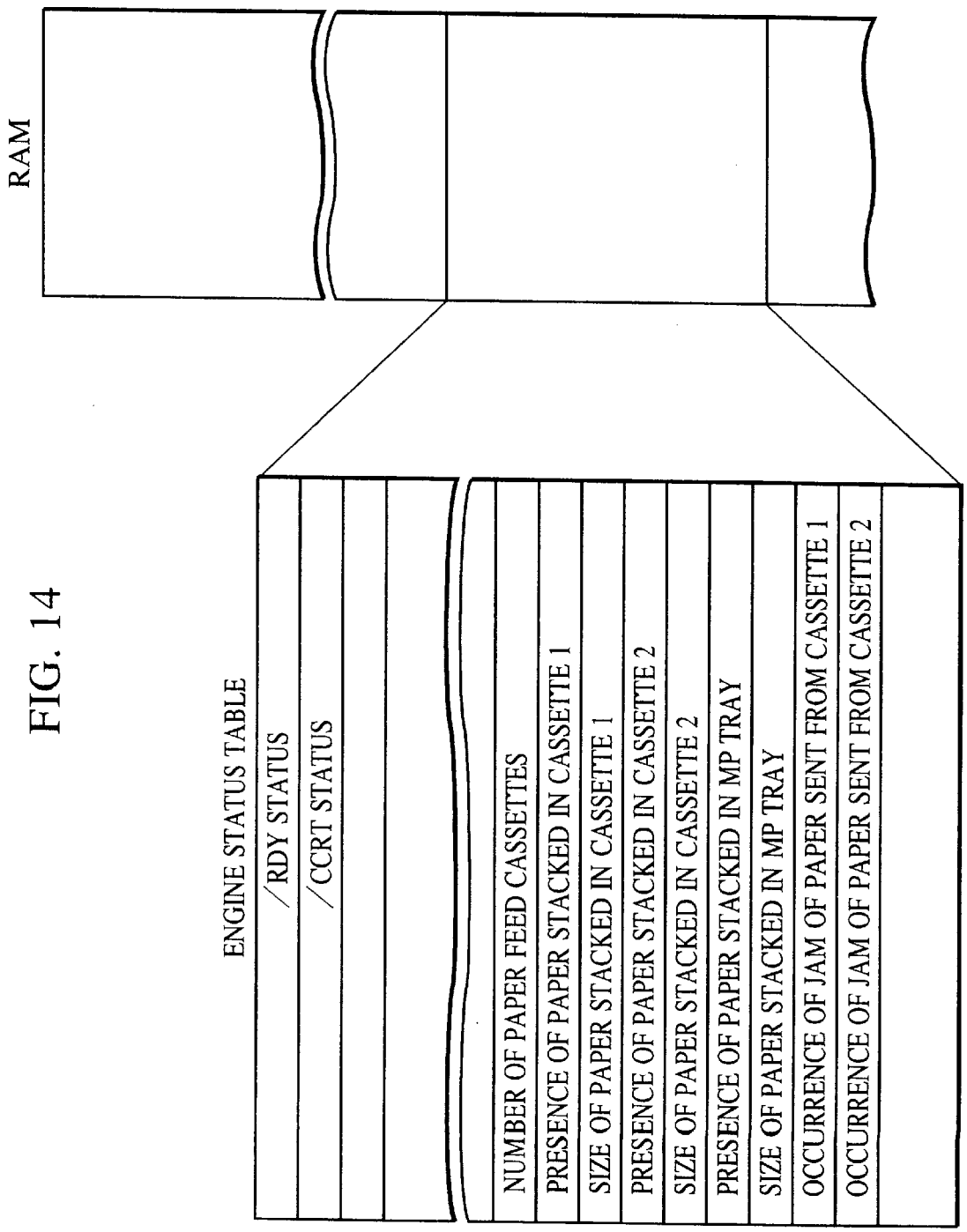
FIG. 14 is a conceptual diagram illustrating the structure of an engine status table stored in the RAM of still another image forming apparatus that is a third embodiment of the present invention.
Figure 15:
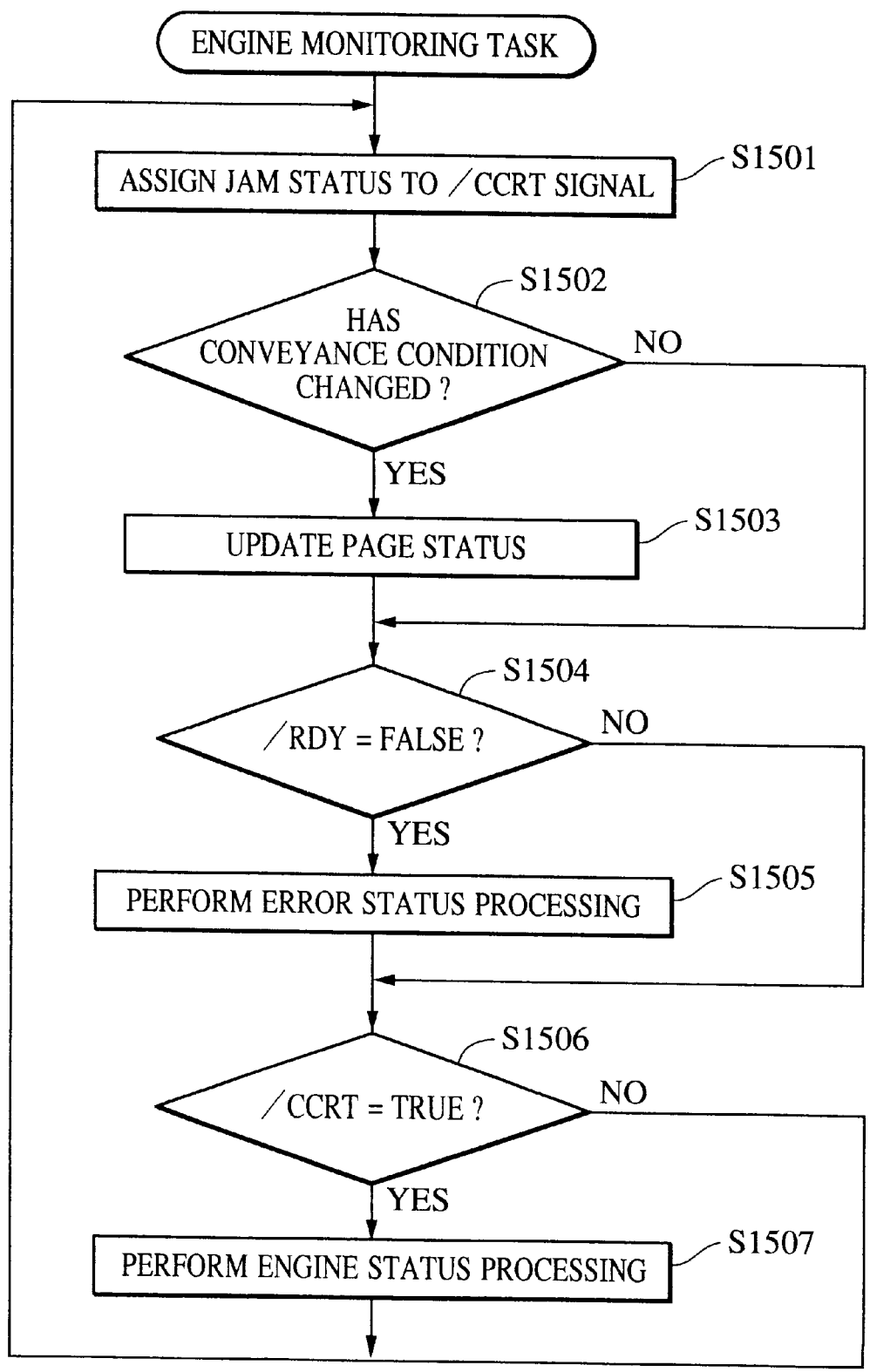
FIG. 15 is a flowchart illustrating the procedure of an engine monitoring processing which corresponds to an engine monitoring task performed in this image forming apparatus, namely, a third embodiment of the present invention.

A third embodiment of the present invention will now be described. This apparatus has a configuration which is basically the same as that of the first embodiment of the present invention, but it is different from the first embodiment in that the status assigned to the /CCRT signal 177 is preliminarily designated. Therefore, in the case of this third embodiment, the configuration thereof is established as illustrated in FIGS. 1 to 4. Further, the page table is provided as illustrated in FIG. 5. However, the engine status table is illustrated in FIG. 14, instead of FIG. 6. The flow of data is illustrated in FIG. 7, and the analysis development task is illustrated in FIG. 8. The page operation task is illustrated in FIG. 9. The engine monitoring task is illustrated in FIG. 15, in place of FIG. 10. In FIGS. 14 and 15, like reference numerals designate the same composing elements as those in the first embodiment.

In the case of the third embodiment of the present invention, the engine control portion 150 selects or designates which of the /CCRT signal 177 and the /RDY signal 172 is used to inform of a change in the statuses including those (for example, the paper jam status) which conventionally and directly relate to the /RDY signal 172. Moreover, as long as the statuses assigned to the /CCRT signals 177 can be printed even when a change in the statuses occurs, the value represented by the /RDY signal 172 is maintained at a value of "TRUE".

FIG. 14 is a block diagram illustrating the structure of an engine status table in this third embodiment. In the engine status table of this figure, the value indicated by the status "OCCURRENCE OF JAM OF PAPER SENT FROM CASSETTE 1" has a value of "TRUE" when a paper jam occurs on the paper conveyance path corresponding to the cassette 210. Further, the value indicated by the status "OCCURRENCE OF JAM OF PAPER SENT FROM CASSETTE 2" has a value of "TRUE" when a paper jam occurs on the paper conveyance path corresponding to the cassette 250. Incidentally, even if both of the values respectively indicated by these statuses "OCCURRENCE OF JAM OF PAPER SENT FROM CASSETTE 1" and "OCCURRENCE OF JAM OF PAPER SENT FROM CASSETTE 2" are "TRUE", a printing operation can be achieved by feeding sheets of paper from the manual paper feed tray 219. The remaining portions of the engine status table are the same as described by referring to FIG. 6.

FIG. 15 is a flowchart illustrating the procedure that results when executing code for an engine monitoring process which corresponds to an engine monitoring task. This process is performed by the CPU 309 based on code in ROM 304 for the engine monitoring task.

When the engine monitoring task is activated in the case that the power supply for the laser beam printer 102 is turned on, the "JAM STATUS" is assigned to the /CCRT signal 177 (in step S1501).

In the subsequent steps S1502 to S1507, the CPU 309 performs operations which are similar to those performed in the steps S1001 through S1006 of FIG. 10. Incidentally, in step S1507, the aforementioned reflection, updating and reset operations are performed similarly as in the case of the other statuses.

In the case of the third embodiment, if the status corresponding to "PAPER JAM" (or "JAM OF PAPER") occurring on the paper feed path, which corresponds to the paper cassette 210, is assigned to the /CCRT signal 177 without being related to the /RDY signal 172, the value indicated by the /RDY signal 172 is not "FALSE" even when a "paper jam" occurs. Thus, a printing operation is not immediately interrupted. At that time, if a printing operation can be achieved by utilizing the paper feed path corresponding to the cassette 250 (it being assumed that other conditions such as the paper size are met), the printing operation can be continued by changing the paper feed path to that, which corresponds to the cassette 250, by the automatic paper feed selection function. Consequently, the automatic paper feed selection function can be smoothly performed.

Moreover, the apparatus may be adapted so that an occurrence of a "paper jam" is recognized individually in the vicinity of the paper feed opening (or entrance), or on a path extending from the paper cassette 210 to the resist shutter 214 and environs, or in a specific path, in addition to the entire paper feed path. In this case, if there is an alternative path for a portion in which the "paper jam" occurs, this alternative path may be utilized.

The designated status, that is, the status that is not assigned to the /RDY signal 172 but rather is assigned to the /CCRT signal 177, is not limited to the "PAPER JAM". Other statuses may be employed for such a status.

Additionally, in the case of the first, second and third embodiments of the present invention, the "STATUS FLAG" of the page table of FIG. 5 may be updated in the engine monitoring state by using a change of the value, which is indicated by the /CCRT signal 177, to "TRUE" as a trigger. Furthermore, the external equipment 101 may be notified or informed of the contents of this updated "STATUS FLAG" through the host interface portion 302 according to a predetermined method by performing the printer control task (not shown). Thus, the external equipment 101 can be notified of the movement and state of the actually conveyed paper in the printer engine portion 105 in real time. Therefore, the monitoring by the external equipment 101 is realized. Incidentally, the apparatus may be adapted so that this notification is sent to the panel portion 104 and that the panel portion 104 displays the movement and state of the paper visually.

Additionally, in the case of the first, second and third embodiments of the present invention, a laser beam printer 102 has been cited as an example of the image forming apparatus. However, the present invention is not limited to the laser beam printer. Specifically, as long as apparatuses are of the type that a unit for controlling what is called a printing process is separated from another unit for controlling various processes such as an image development, the present invention may be applied to such apparatuses. For instance, an ink jet printer, a facsimile system, a copying machine (or copier) or a compound apparatus constituted by a combination of such apparatus, system and machine.

Although the preferred embodiments of the present invention have been described above, it should be understood that the present invention is not limited thereto and that other modifications will be apparent to those skilled in the art without departing from the spirit of the invention.

The scope of the present invention, therefore, should be determined solely by the appended claims.

What is claimed is:

1. An image processing apparatus for controlling an image forming portion, which is operative to form an image and comprises generating means for generating a change signal indicating a change in at least one predetermined condition of said image forming portion, according to the condition of said image forming portion, said image processing apparatus comprising:

accepting means for accepting the change signal generated by said generating means; and requesting means for requesting condition information, which represents the condition of said image forming portion, when the change signal generated by said generating means is accepted by said accepting means.

2. The image processing apparatus according to claim 1, wherein the condition information is transmitted by a serial communication from said image forming portion.

3. The image processing apparatus according to claim 1, wherein said accepting means accepts the change signal from a signal line originating at the image forming portion and dedicated to carrying only the change signal.

4. The image processing apparatus according to claim 1, wherein the predetermined condition is at least one of a condition of a size of paper stored in a paper feed part of said image forming portion, a condition of presence or absence of paper in said paper feed part of said image forming portion, a power-thrifty condition of said image forming portion, an image forming condition of said image forming portion and a condition of conveyance of paper in said image forming portion.

5. The image processing apparatus according to claim 1, which further comprises designating means for designating a condition, corresponding to which a change signal is generated by said generating means, among the predetermined conditions.

6. The image processing apparatus according to claim 5, wherein the condition, corresponding to which a change signal is generated by said generating means, is designated by at least one of an operation, which is performed on an operating portion, and an external command.

7. The image processing apparatus according to claim 5, wherein the condition, corresponding to which a change signal is generated by said generating means, is designated according to an operating condition of said image processing apparatus.

8. The image processing apparatus according to claim 1, which further comprises receiving means for receiving condition information returned in response to a request made by said requesting means.

9. The image processing apparatus according to claim 8, which further comprises: at least one of visual display means for producing a visual display according to the received condition information; and transmitting means for transmitting the received condition information to an external device.

10. The image processing apparatus according to claim 1, which further comprises changing means for changing a current paper conveyance path to another paper conveyance path when a failure in a current paper conveyance condition in said image forming portion is recognized based on the condition information.

11. The image processing apparatus according to claim 1, which further comprises resetting means for resetting the change signal generated by said generating means.

12. The image processing apparatus according to claim 11, wherein the change signal is reset by said resetting means after said requesting means requests the condition information.

13. The image processing apparatus according to claim 1, which further comprises said image forming portion having a printer engine for forming an image by an electrophotographic system.

14. A control method of controlling an image forming portion, which is operative to form an image, according to a condition of said image forming portion, said control method comprises:

an accepting step of accepting a change signal indicating that at least one predetermined condition of said image forming portion changes; and a requesting step of requesting condition information, which represents a condition of said image forming portion, when the change signal is accepted by said accepting step.

15. The control method according to claim 14, which further comprises a receiving step of receiving the condition information by performing a serial communication with said image forming portion.

16. The control method according to claim 15, wherein in said accepting step the change signal is accepted from a signal line originating at the image forming portion and dedicated to carrying only the change signal.

17. The control method according to claim 14, wherein the predetermined condition is at least one of a condition of a size of paper stored in a paper feed part of said image forming portion, a condition of presence or absence of paper in said paper feed part of said image forming portion, a power-thrifty condition of said image forming portion, an image forming condition of said image forming portion and a condition of conveyance of paper in said image forming portion.

18. The control method according to claim 14, which further comprises a designating step of designating a condition, corresponding to which a change signal is generated in said generating step, among the predetermined conditions.

19. The control method according to claim 14, which further comprises an informing step of informing an external device of the condition information received in said receiving step.

20. An image forming system comprising:
an image forming portion having:
means for forming an image; and
generating means for generating a change signal indicating a change in at least one predetermined condition of said image forming portion; and
a control portion having:

accepting means for accepting the change signal generated by said generating means;

recognizing means for recognizing the predetermined condition when the change signal generated by said generating means is accepted by said accepting means;

reset means for resetting the change signal independent of the predetermined condition; and control means for controlling said image forming portion according to the predetermined condition recognized by said recognized means.

21. An image forming system according to claim 20, wherein said image forming portion includes output means for outputting the change signal over a dedicated signal line, and serial communication means for carrying out serial communications with said control portion and over which said control means controls said image forming portion, and wherein said control portion accepts the change signal from the dedicated signal line.

22. An image processing apparatus, included in an image forming system, for controlling an image forming portion, said image processing apparatus comprising:

receiving means for receiving a condition change signal outputted from said image forming portion; and designating means for designating a kind of condition of said image forming portion, according to conditions of said image processing apparatus or said image forming system, wherein the condition change signal is outputted in response to a change in a condition of the kind designated by said designating means.

23. An apparatus according to claim 22, further comprising conversion means for converting information from an external device into bit-map data.

24. An apparatus according to claim 22, wherein the condition is at least one of a condition of a size of paper stored in a paper feed part of said image forming portion, a condition of presence or absence of paper in said paper feed part of said image forming portion, a power-thrifty condition of said image forming portion, an image forming condition of said image forming portion and a condition of conveyance of paper in said image forming portion.

25. An apparatus according to claim 22, wherein the kind of condition designated by said designating means includes at least one of a condition of presence or absence of paper and a condition of the size of paper, when said apparatus is in an idling condition.

26. An apparatus according to claim 22, wherein the kind of condition designated by said designating means includes a condition of presence or absence of paper when said apparatus is printing.

27. An apparatus according to claim 22, further comprising recognizing means for recognizing the changed condition based on the received change signal.

28. An image forming system comprising:
an image processing apparatus; and
an image forming portion,
wherein said image processing apparatus has:
receiving means for receiving a condition change signal outputted from said image forming portion; and
designating means for designating a kind of condition of said image forming portion, according to conditions of said image processing apparatus or said image forming system, and
wherein said image forming portion has:
output means for outputting the condition change signal in response to a change in a condition of the kind designated by said designating means.

29. An apparatus according to claim 28, further comprising conversion means for converting information from an external device into bit-map data.

30. An apparatus according to claim 28, wherein the condition is at least one of a condition of a size of paper stored in a paper feed part of said image forming portion, a condition of presence or absence of paper in said paper feed part of said image forming portion, a power-thrifty condition of said image forming portion, an image forming condition of said image forming portion and a condition of conveyance of paper in said image forming portion.

31. An apparatus according to claim 28, wherein the kind of condition designated by said designating means includes at least one of a condition of presence or absence of paper and a condition of the size of paper, when said apparatus is in an idling condition.

32. An apparatus according to claim 28, wherein the kind of condition designated by said designating means includes a condition of presence or absence of paper when said apparatus is printing.

33. An apparatus according to claim 28, further comprising recognizing means for recognizing the changed condition based on the received change signal.

34. An image processing apparatus for controlling an image forming portion, which is operative to form an image and comprises generating means for generating a change signal indicating a change in at least one predetermined condition of said image forming portion, according to the condition of said image forming portion, said image processing apparatus comprising:

monitoring means for monitoring the change signal generated by said generating means; and requesting means for requesting condition information, which represents the condition of said image forming portion, when the change signal generated by said generated means is monitored by said monitoring means.

35. An apparatus according to claim 34, wherein the predetermined condition is at least one of a condition of a size of paper stored in a paper feed part of said image forming portion, a condition of presence or absence of paper in said paper feed part of said image forming portion, a power-thrifty condition of said image forming portion, an image forming condition of said image forming portion and a condition of conveyance of paper in said image forming portion.

36. An apparatus according to claim 34, further comprising designating means for designating a condition, corresponding to which the change signal is generated by said generating means, among the predetermined conditions.

37. An apparatus according to claim 36, wherein the condition, corresponding to which the change signal is generated by said generating means, is designated according to an operating condition of said image processing apparatus.

38. An apparatus according to claim 34, further comprising receiving means for receiving the condition information returned in response to a request made by said requesting means.

39. An apparatus according to claim 34, further comprising informing means for externally informing of the received condition information.

40. An apparatus according to claim 34, further comprising said image forming portion.

41. A control method of controlling an image forming portion, which is operative to form an image, according to a condition of said image forming portion, said control method comprises:

a monitoring step of monitoring a change signal indicating a change in at least one predetermined condition of said image forming portion; and a requesting step of requesting condition information, which represents the condition of said image forming portion, when the change signal is monitored by said monitoring step.

42. A method according to claim 41, further comprising a receiving step of receiving the condition information by performing a serial communication with said image forming portion.

43. A method according to claim 42, wherein said monitoring means monitors the change signal from a signal line originating at the image forming portion and dedicated to carrying only the change signal.

44. A method according to claim 42, further comprising an informing step of informing an external device of the condition information received in said receiving step.

45. A method according to claim 41, wherein the predetermined condition is at least one of a condition of a size of paper stored in a paper feed part of said image forming portion, a condition of presence or absence of paper in said paper feed part of said image forming portion, a power-thrifty condition of said image forming portion, an image forming condition of said image forming portion and a condition of conveyance of paper in said image forming portion.

46. A method according to claim 41, further comprising a designating step of designating a condition, corresponding to which the change signal is generated in said generating step, among the predetermined conditions.

* * * * *

UNITED STATES PATENT AND TRADEMARK OFFICE
CERTIFICATE OF CORRECTION

PATENT NO. : 5,940,653

DATED : August 17, 1999

INVENTOR(S) : SHINICHIRO MAEKAWA, ET AL.

It is certified that error appears in the above-identified patent and that said Letters Patent is hereby corrected as shown below:

IN THE DRAWINGS
Sheet 7, FIG. 7, "BOOCK" should read --BLOCK--.

COLUMN 4
Lines 44-45, "predetermined.    Conditions" should read --predetermined conditions--.

COLUMN 8
Line 18, "operative-to" should read --operative to--.

COLUMN 9
Line 66, "processing-unit)" should read --processing unit)--.

UNITED STATES PATENT AND TRADEMARK OFFICE
CERTIFICATE OF CORRECTION

PATENT NO. : 5,940,653

DATED : August 17, 1999

INVENTOR(S) : SHINICHIRO MAEKAWA, ET AL.

It is certified that error appears in the above-identified patent and that said Letters Patent is hereby corrected as shown below:

COLUMN 14
Line 67, "changes As" should read --changes. As--.

COLUMN 20
Line 7, "apparatuses. For" should read --apparatuses, for--.

COLUMN 22
Line 11, "recognized" should read --recognizing--.

COLUMN 23
Line 36, "generated" should read --generating--.

Signed and Sealed this

Sixth Day of June, 2000

*Attest:*

Q. TODD DICKINSON

*Attesting Officer*  *Director of Patents and Trademarks*